(12) United States Patent
Balsundaram et al.

(10) Patent No.: US 12,373,900 B2
(45) Date of Patent: *Jul. 29, 2025

(54) SYSTEM AND METHOD FOR RECOGNIZING REVENUE AND MANAGING REVENUE LIFECYCLES

(71) Applicant: Zuora, Inc., Redwood City, CA (US)

(72) Inventors: Jagan Balsundaram, Santa Clara, CA (US); Seshagiri Chilukuri, San Jose, CA (US); Katherine Pearson, San Jose, CA (US); Karthikeyan Ramamoorthy, San Jose, CA (US)

(73) Assignee: Zuora, Inc., Redwood City, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/425,417

(22) Filed: Jan. 29, 2024

(65) Prior Publication Data

US 2024/0403973 A1 Dec. 5, 2024

Related U.S. Application Data

(63) Continuation of application No. 17/147,221, filed on Jan. 12, 2021, now Pat. No. 11,887,198, which is a
(Continued)

(51) Int. Cl.
*G06Q 40/00* (2023.01)
*G06Q 30/018* (2023.01)
*G06Q 40/12* (2023.01)

(52) U.S. Cl.
CPC ......... *G06Q 40/128* (2013.12); *G06Q 30/018* (2013.01)

(58) Field of Classification Search
CPC .............. G06Q 40/128; G06Q 30/018; G06Q 30/01875
(Continued)

(56) References Cited

U.S. PATENT DOCUMENTS 7,330,717 B2   2/2008  Gidron et al.
7,418,426 B1   8/2008  Reunert et al.
(Continued)

OTHER PUBLICATIONS

Aguilera, Marcos K., et al., "Matching Events in a Content-Based Subscription System", Proceedings ofthe Eighteenth Annual ACM Symposium on Principles of Distributed Computing, 1999 (Year: 1999), pp. 53-61.
(Continued)

*Primary Examiner* — Rokib Masud
(74) *Attorney, Agent, or Firm* — Sheppard Mullin Richter & Hampton LLP

(57) ABSTRACT

A system and method for calculating variable consideration for performance obligations. The method can involve, checking a database for historical transaction data, accessing the historical transaction data, and applying one or more predetermined variable consideration rules to the historical transaction data. The method can include automatically analyzing the historical transaction data generating an analysis report based on the data. The method can include uploading predetermined corrections to variable consideration transactions to a database or other storage medium and applying the corrections to historical performance obligation transaction data. The method can include determining whether variable consideration changes should be applied to individual transaction lines within the variable consideration transactions.

16 Claims, 33 Drawing Sheets

Related U.S. Application Data continuation of application No. 16/216,934, filed on Dec. 11, 2018, now Pat. No. 10,891,697, which is a continuation of application No. 15/003,593, filed on Jan. 21, 2016, now Pat. No. 10,152,755.

(60) Provisional application No. 62/106,095, filed on Jan. 21, 2015.

(58) Field of Classification Search
USPC .......................................................... 705/33
See application file for complete search history.

(56) References Cited

U.S. PATENT DOCUMENTS

| | | | |
|---|---|---|---|
| 7,640,213 B2 | 12/2009 | Reunert et al. | |
| 8,135,633 B1 | 3/2012 | LeBaron et al. | |
| 8,204,809 B1* | 6/2012 | Wise | G06Q 40/06 705/36 R |
| 8,798,576 B2 | 8/2014 | Krishnamoorthy et al. | |
| 8,918,506 B1* | 12/2014 | Clubb | G06Q 20/36 709/224 |
| 9,892,467 B2 | 2/2018 | Shak et al. | |
| 10,152,755 B2 | 12/2018 | Balsundaram et al. | |
| 10,311,522 B1 | 6/2019 | Jin et al. | |
| 10,713,732 B2 | 7/2020 | Shak et al. | |
| 2004/0111346 A1* | 6/2004 | Macbeath | G06Q 40/02 705/35 |
| 2005/0171873 A1 | 8/2005 | Alberti et al. | |
| 2005/0222928 A1 | 10/2005 | Steier et al. | |
| 2005/0278232 A1 | 12/2005 | Bruffey et al. | |
| 2006/0064370 A1 | 3/2006 | Mojsilovic et al. | |
| 2006/0149643 A1 | 7/2006 | Reiner et al. | |
| 2006/0190366 A1 | 8/2006 | Nelson et al. | |
| 2006/0235773 A1 | 10/2006 | Nelson et al. | |
| 2007/0168209 A1 | 7/2007 | Shah | |
| 2008/0033873 A1* | 2/2008 | Krishnamoorthy | G06Q 20/102 705/40 |
| 2009/0216582 A1* | 8/2009 | Moran | G06Q 30/04 705/7.38 |
| 2013/0073521 A1 | 3/2013 | Ng et al. | |
| 2014/0101008 A1 | 4/2014 | Dennis | |
| 2014/0114709 A1 | 4/2014 | Olsen et al. | |

OTHER PUBLICATIONS

Dempsey, David, et al., "Recurring Revenue Model in Practice", Industry Trends in Cloud Computing, Palgrave Macmillan, Chem, 2018 (Year: 2018), pp. 139-183.

Jhang-Li, Jhih-Hua, et al., "Resource Allocation and Revenue Optimization for Cloud Service Providers", Decision Support Systems, vol. 77, 2015, pp. 55-66.

IFRS Foundation, "IFRS 15 Revenue from Contracts with Customers", International Financial Reporting Standard, May 2014, 88 pages.

Leeyo Software Inc., "New Revenue Recognition Standard ASU Sep. 2014", 2013, 11 pages.

Financial Accounting Standards Board, "Accounting Standards Update No. Sep. 2014: Revenue from Contracts with Customers (Topic 6306)", May 2014, 154 pages.

Skoviera, Martin, et al., "Monetization of Infrastructures and Services", 2017 European Conference on Networks and Communications (EuCNC), 2017 (Year: 2017), pp. 1-5.

* cited by examiner

| Revenue Treatment | Cost Treatment | VC assignment | Revenue Forecast | POB Dependency | | | |
|---|---|---|---|---|---|---|---|

Date Hierarchy — 504

500 ↗
502
506 — Schedules
508

| Seq # ▲ | Base Line Date | Adjustment Period | Seq # ▲ | Duration Type | Duration | Percent |
|---|---|---|---|---|---|---|
| 10 | SO Booking Date | ∨ | 10 | Days | 90 | 35.00 |
| | | Current | 20 | Days | 180 | 10.00 |
| | | Remaining | 30 | Days | 270 | 10.00 |
| | | End | 40 | Days | 360 | 10.00 |
| | | | 50 | Days | 450 | 15.00 |
| | | | 60 | Days | 540 | 10.00 |
| | | | 70 | Days | 630 | 5.00 |
| | | | 80 | Days | 720 | 5.00 |
| | | | | | | 100.00 |

| VC Type | VC Template | VC Upload | | | | | | | | | |
|---|---|---|---|---|---|---|---|---|---|---|---|
| | | | 702 | 704 | 706 | | | | | | |
| | | | | | | | Adjustment Account | | | | |
| Name | Description | Enabled | Revenue Impact | Allocation Impact | Calculation Level | Company | Department | Cost Center | Account | Company | Departm |
| Customer Rebate | Customer Rebate | ☑ | ☑ | ☑ | Net Amount | 100 | 00 | 0000 | 21500 | 100 | 00 |
| Volume Rebate | Volume Rebate | ☑ | ☑ | ☑ | Gross Amount | 100 | 00 | 0000 | 21500 | 100 | 00 |
| VC-1 | Variable Consideration | ☑ | ☑ | ☐ | Net Amount | 100 | 200 | 300 | 700 | 100 | 200 |

Cost Type — 1002

| Cost Type | Company | Department | Cost Center | Account | Include In Margin Calculation |
|---|---|---|---|---|---|
| Commission | 100 | 10 | 1000 | 63500 | ☐ |
| Std Cost | 100 | 10 | 0000 | 50100 | ☑ |

| Summary Dashboard ☒ | Revenue Contract ☒ | | | | | | |
|---|---|---|---|---|---|---|---|
| Search \| ≫ | Batches \| By Customer | | | | | | |
| Search ▼ | Search ▼ \| Enter search text here... ☒ 🔍 | | | | | | |
| Customer Name | RC # | Version | Currency | Sell Amount | Progress | Revenue | Allocation Treatm | Customer Name |
| ABC INC. | 1 | 1 | USD | 1,600 | 0.00% 0.00 — 1,600.00 | 0.00 | 0 | |
| XYZ INC. | RC30003-VC | 1 | USD | 752,720.00 | 45.05% 339,063.07 — 752,720.00 | 339,063.07 | R | XYZ INC. |
| | RC30001 | 1 | USD | 1,040,000.00 | 49.00% 509,600.00 — 1,040,000.00 | 509,600.00 | R | ABC INC. |
| | RC20002 | 1 | USD | 1,040,000.00 | 37.04% 385,185.18 — 1,040,000.00 | 385,185.18 | 0 | ABC INC. |
| | RC20001 | 1 | USD | 1,040,000.00 | 49.10% 510,600.00 — 1,040,000.00 | 510,600.00 | 0 | ABC INC. |
| | RC10000 | 1 | USD | 1,600.00 | 0.00% 0.00 — 1,600.00 | 0.00 | 0 | |
| | RC20003-VC | 1 | USD | 800,000.00 | 0.00% 0.00 — 800,000.00 | 0.00 | 0 | XYZ INC. |

Revenue Contract

Customer: ABC INC   Contract Value: 1,879,500.00   Revenue to Debit: 880,088.90   Unreleased Revenue: 873,317.73   Contract Asset: 190,588.90

| Overview | Transactions | Waterfall | Accounting | Revenue Summary | Notes & Attachments | Approvals | Holds |

Search ▼  Search Entries... 🔍 ✕    Revenue Book: Default Book ✕ ▼

| POB Name | POB Template | Release Event | Item # | Start Date | End Date | Revenue | List Price | Sell Price | Allocatable |
|---|---|---|---|---|---|---|---|---|---|
| ⊟ HARDWARE | Shipment | Shipment QTY | | | | 60% | 1,000,000.00 | 400,000.00 | 400.00 |
|   CL-1-3 | | | Hardware | 14-APR-14 | 13-APR-15 | | 1,000,000.00 | 400,000.00 | 400.00 |
|     SO-100-3 | | | Hardware | | | | | 400,000.00 | 400.00 |
| ⊟ HW-SUPPORT | Autorelease | Billing | | | | 0% | 50,000.00 | 20,000.00 | 20.00 |
|   CL-1-4 | | | HW-PCS | 14-APR-14 | 12-APR-15 | | 50,000.00 | 20,000.00 | 20.00 |
|     SO-100-4 | | | HW-PCS | | | | | 20,000.00 | 20.00 |
| ⊟ SL1 | Hours Input | Input Hours POC | | | | 2.5% | 300,000.00 | 250,000.00 | 250.00 |
|   CL-1-1 | | | Consulting | 14-APR-14 | 13-APR-15 | | 300,000.00 | 250,000.00 | 250.00 |
|     SO-100-1 | | | Consulting | | | | | 250,000.00 | 250.00 |
| ⊟ SL2 | Cost Input | Cost Input POC | | | | 25% | 850,000.00 | 640,000.00 | 640.00 |
|   CL-1-7 | | | Implementation | | | | 800,000.00 | 600,000.00 | 600.00 |
|     SO-200-3 | | | Implementation | | | | | 600,000.00 | 600.00 |
|   CL-1-8 | | | Project Management | | | | 50,000.00 | 40,000.00 | 40.00 |
|     SO-200-4 | | | Project Management | | | | | 40,000.00 | 40.00 |

| | | | | | | |
|---|---|---|---|---|---|---|
| SOFTWARE | Acceptance | | | | | |
| CL-1-5 | Acceptance | Software | | 1,400,000.00 | 400,000.00 | 400,00 |
| SO-200-1 | | Software | 01-APR-14 | 30-SEP-14 | 100% | 1,400,000.00 | 400,000.00 | 400,00 |
| | | | | | 1,400,000.00 | 400,000.00 | 400,00 |
| SUBSCRIPTION | Autorelease | Billing | | | | |
| CL-1-2 | | Subscription | 01-APR-14 | 30-SEP-14 | 100% | 150,000.00 | 90,000.00 | 90,00 |
| SO-100-2 | | Subscription | 01-APR-14 | 30-SEP-14 | | 150,000.00 | 90,000.00 | 90,00 |
| SW-SUPPORT | Acceptance | | | | | 150,000.00 | 90,000.00 | 90,00 |
| CL-1-6 | Acceptance | SW-PCS | 14-APR-14 | 13-APR-15 | 100% | 252,000.00 | 72,000.00 | 72,00 |
| SO-200-2 | | SW-PCS | 14-APR-14 | 13-APR-15 | | 252,000.00 | 72,000.00 | 72,00 |
| T&E | Autorelease | Billing | | | | 252,000.00 | 72,000.00 | 72,00 |
| CL-1-9 | | T&E | 14-APR-14 | 13-APR-15 | 100% | 0.00 | 7,500.00 | 7,50 |
| SO-200-5 | | T&E | | | | 0.00 | 7,500.00 | 7,50 |
| | | | | | | 0.00 | 7,500.00 | 7,50 |

FROM FIG. 18A

| Overview | Transactions | Waterfall | Accounting | Revenue Summary | Notes & Attachments | Approvals | Holds |

Search ▼ | Search Entries... [x] [🔍] | [⟲] [▦] [▦] | Revenue Book: Default Book [x] [˅] |

| POB Name | POB Template | Release Event | Item # | Start Date | End Date | Revenue | List Price |
|---|---|---|---|---|---|---|---|
| ⊟ Ⓐ HARDWARE | Shipment | Shipment QTY | | | | 60% | 1,000,000.00 |
|    ⊞ Ⓑ CL-1-3  1811 | | | Hardware | | | | 1,000,000.00 |
|      ⊙ SO-100-3 | | | Hardware | | | 1810 | 1,000,000.00 |
| ⊟ Ⓐ HW-SUPPORT | Autorelease | Billing | HW-PCS | 14-APR-14 | 13-APR-15 | 0% | 50,000.00 |
|    ⊞ Ⓑ CL-1-4 | | | HW-PCS | 14-APR-14 | 13-APR-15 | | 50,000.00 |
|      ⊙ SO-100-4 | | | HW-PCS | 14-APR-14 | 13-APR-15 | | 50,000.00 |
| ⊟ Ⓐ SL1 | Hours Input | Input Hours POC | Consulting | | | 2.5% | 300,000.00 |
|    ⊞ Ⓑ CL-1-1 | | | Consulting | | | | 300,000.00 |
|      ⊙ SO-100-1 | | | | | | | 300,000.00 |
| ⊟ Ⓐ SL2 | Cost Input | Cost Input POC | Implementation | | | 25% | 850,000.00 |
|    ⊞ Ⓑ CL-1-7 | | | Implementation | | | | 800,000.00 |
|    ⊞ Ⓑ CL-1-8 | | | Project Management | | | | 800,000.00 |
|      ⊙ SO-200-4 | | | Project Management | | | | 50,000.00 |
| ⊟ Ⓐ SOFTWARE | Acceptance | Acceptance | | | | 100% | 1,400,000.00 |
|    ⊞ Ⓑ CL-1-5 | | | Software | | | | 1,400,000.00 |

|◁ ◁| Page [1] of 1 |▷ ▷|  [⟲]

TO FIG. 18B (CONTINUED)

FROM FIG. 18B

Line Details

| Billings | Cost Elements | Transaction Pricing | Revenue Actions | Waterfall | Accounting |

Search ▼ [Enter search text here.... ✕ 🔍]

| Cost Type | Total Cost | Cost Capitalized | Cost Recognized | Sales Order # | Sales Order Line | Item # | Include in Margin Calculation |
|---|---|---|---|---|---|---|---|
| Std Cost | 200,000.00 | 80,000.00 | 120,000.00 | SO-100 | 3 | Hardware | Y |
| Commission | 12,000.00 | 4,800.00 | 7,200.00 | SO-100 | 3 | Hardware | N |
| | 212,000.00 | 84,800.00 | 127,200.00 | | | | |

| POB Name | POB Template | Release Event | Item # | Start Date | End Date | Revenue | List Price | Sell Price | Allocatable | FV Value | Allocated |
|---|---|---|---|---|---|---|---|---|---|---|---|
| HARDWARE | Shipment | Shipment QTY | Hardware | | | 60% | 1,000,000.00 | 400,000.00 | 400,000.00 | 500,000.00 | 378.0 |
| SO-100-3 | | | Hardware | | | | 1,000,000.00 | 400,000.00 | 400,000.00 | 500,000.00 | 378.0 |
| HW-SUPPORT | Autorelease | Billing | HW-PCS | 14-APR-14 | 13-APR-15 | 0% | 50,000.00 | 20,000.00 | 20,000.00 | 25,000.00 | 18.9 |
| SO-100-4 | | | HW-PCS | 14-APR-14 | 13-APR-15 | | 50,000.00 | 20,000.00 | 20,000.00 | 25,000.00 | 18.9 |
| SL1 | Hours Input | Input Hours POC | Consulting | 14-APR-14 | 13-APR-15 | 2.5% | 300,000.00 | 250,000.00 | 250,000.00 | 300,000.00 | 226.8 |
| SO-100-1 | | | Consulting | | | | 300,000.00 | 250,000.00 | 250,000.00 | 300,000.00 | 226.8 |
| SL2 | Cost Input | Cost Input POC | Implementation | | | 25% | 850,000.00 | 640,000.00 | 640,000.00 | 850,000.00 | 642.7 |
| CL-1-7 | | | | | | | 800,000.00 | 600,000.00 | 600,000.00 | 800,000.00 | |

TO FIG. 18D (CONTINUED)

FROM FIG. 18D

1812

Line Details

Billings | Cost Elements | Transaction Pricing | Revenue Actions | Waterfall | Accounting Search ▼  Enter search text here... [x] 🔍   Waterfall Type: Revenue [x] ∨   Forecast: Actuals and Forecast [x] ∨

| POB Name | POB Template Na | POB Event Name | Customer Name | Contract Number | Contract Line Nu | Sales Order | Sales Order Line | Item Num | Ext Sell Price | Allocated Amount | Unscheduled Am | APR-14 | AUG-14 |
|---|---|---|---|---|---|---|---|---|---|---|---|---|---|
| HARDWARE | Shipment | Shipment Qty | ABC INC. | CL-1 | 3 | SO-100 | 3 | Hardware | 400,000.00 | 378,059.62 | 151,223.85 | 226,835.77 | 0.00 |
| HARDWARE | Shipment | | ABC INC. | CL-1 | 3 | SO-100 | 3 | Hardware | 400,000.00 | 378,059.62 | 0.00 | 0.00 | 378,059.62 |
| | | | | | | | | | 800,000.00 | 756,119.24 | 151,223.85 | 226,835.77 | 378,059.62 |

| POB Name | POB Template | Release Event | Item # | Start Date | End Date | Revenue | List Price | Sell Price | Allocatable | FV Value | Allocated |
|---|---|---|---|---|---|---|---|---|---|---|---|
| ⊞ Ⓐ HARDWARE | Shipment | Shipment QTY | | | | 60% | 1,000,000.00 | 400,000.00 | 400,000.00 | 500,000.00 | 378,0 |
| ⊟ Ⓐ CL-1-3 | | | Hardware | | | | 1,000,000.00 | 400,000.00 | 400,000.00 | 500,000.00 | 378,0 |
| ○ SO-100-3 | | | Hardware | | | | | | | | |
| ⊞ Ⓐ HW-SUPPORT | Autorelease Billing | | | 14-APR-14 | 13-APR-15 | 0% | 50,000.00 | 20,000.00 | 20,000.00 | 25,000.00 | 18,9 |
| ⊟ Ⓐ CL-1-4 | | | HW-PCS | 14-APR-14 | 13-APR-15 | | 50,000.00 | 20,000.00 | 20,000.00 | 25,000.00 | 18,9 |
| ○ SO-100-4 | | | HW-PCS | 14-APR-14 | 13-APR-15 | | | | | | |
| ⊞ Ⓐ SL1 | Hours Input | Input Hours POC | Consulting | | | 2.5% | 300,000.00 | 250,000.00 | 250,000.00 | 300,000.00 | 226,8 |
| ⊟ Ⓐ CL-1-1 | | | Consulting | | | | 300,000.00 | 250,000.00 | 250,000.00 | 300,000.00 | 226,8 |
| ○ SO-100-1 | | | | | | | | | | | |
| ⊞ Ⓐ SL2 | Cost Input | Cost Input POC | Implementation | | | 25% | 850,000.00 | 640,000.00 | 640,000.00 | 850,000.00 | 642,7 |
| ⊟ Ⓐ CL-1-7 | | | | | | | 800,000.00 | 600,000.00 | 600,000.00 | 800,000.00 | |

FROM FIG. 18E

Line Details

Billings | Cost Elements | Transaction Pricing | Revenue Actions | Waterfall | Accounting Search ▼  Enter search text here... ✕ 🔍

| Period Name | Account type | GL Account | Transactional Currency | Transactional Debit | Transactional Credit | Functional Debit | Functional Credit | Reporting Debit | Reporting Credit | Transf |
|---|---|---|---|---|---|---|---|---|---|---|
| APR-14 | Commission Accrued | 100:00:0000:15900 | USD | 0.00 | 7,200.00 | 0.00 | 7,200.00 | 0.00 | 7,200.00 | N |
| APR-14 | Commission Expense | 100:00:0000:63500 | USD | 7,200.00 | 0.00 | 7,200.00 | 0.00 | 7,200.00 | 0.00 | N |
| APR-14 | Contract Liability | 100:00:0000:22000 | USD | 226,835.77 | 0.00 | 226,835.77 | 0.00 | 226,835.77 | 0.00 | N |
| APR-14 | COGS Capitalized | 100:00:0000:15800 | USD | 200,000.00 | 120,000.00 | 200,000.00 | 120,000.00 | 200,000.00 | 120,000.00 | N |
| APR-14 | COGS | 100:00:0000:50100 | USD | 120,000.00 | 0.00 | 120,000.00 | 0.00 | 120,000.00 | 0.00 | N |
| APR-14 | Revenue | 100:00:0000:40000 | USD | 0.00 | 226,835.77 | 0.00 | 226,835.77 | 0.00 | 226,835.77 | N |
| | | | | 554,035.77 | 354,035.77 | 554,035.77 | 354,035.77 | 554,035.77 | 354,035.77 | |

Revenue Contract

Customer: ABC INC  Contract Value: 1,879,500.00  Revenue to Debit: 880,088.90  Unreleased Revenue: 873,317.73  Contract Asset: 190,588.90

Overview | Transactions | Waterfall | Accounting | Revenue Summary | Notes & Attachments | Approvals | Holds ☐ Waterfall Revenue Type ▼  1822

Revenue [x]

Search ▼ Enter search text here... [x] 🔍 | Actuals and Forecast [x] ▶

| POB Name | Item Num | APR-14 | MAY-14 | JUN-14 | JUL-14 | AUG-14 | SEP-14 | OCT-14 | NOV-14 |
|---|---|---|---|---|---|---|---|---|---|
| HARDWARE | Hardware | 226,835.77 | 0.00 | 0.00 | 0.00 | 0.00 | 0.00 | 0.00 | 0.00 |
| SUBSCRIPTION | Subscription | 17,353.56 | 17,932.01 | 17,353.56 | 17,932.01 | 17,932.01 | 17,353.54 | 0.00 | 0.00 |
| SL1 | Consulting | 5,670.59 | 0.00 | 0.00 | 0.00 | 0.00 | 0.00 | 0.00 | 0.00 |
| HW-SUPPORT | HW-PCS | 0.00 | 0.00 | 0.00 | 0.00 | 0.00 | 0.00 | 0.00 | 0.00 |
| SW-SUPPORT | SW-PCS | 0.00 | 0.00 | 3,341.01 | 6,473.21 | 6,473.21 | 6,264.40 | 6,473.21 | 6,264.40 |
| T&E | T&E | 7,500.00 | 0.00 | 0.00 | 0.00 | 0.00 | 0.00 | 0.00 | 0.00 |
| SL2 | Implementation | 0.00 | 0.00 | 0.00 | 60,489.54 | 0.00 | 60,489.54 | 0.00 | 0.00 |
| SL2 | Project Manag... | 0.00 | 0.00 | 0.00 | 3,780.60 | 0.00 | 3,780.60 | 0.00 | 0.00 |
| SL2 | Implementation | 30,244.77 | 84,685.35 | 36,293.72 | 0.00 | 0.00 | 0.00 | 0.00 | 0.00 |
| SOFTWARE | Software | 0.00 | 0.00 | 423,426.77 | 0.00 | 44,232.98 | 0.00 | 0.00 | 0.00 |
| SL1 | Consulting | 0.00 | 0.00 | 0.00 | 0.00 | 27,220.39 | 34,025.37 | 34,025.37 | 29,488.65 |
| HARDWARE | Hardware | 0.00 | 0.00 | 0.00 | 0.00 | 378,059.52 | 0.00 | 0.00 | 0.00 |
| SL2 | Project Manag... | 1,890.30 | 5,292.83 | 2,268.36 | 0.00 | 0.00 | 0.00 | 0.00 | 0.00 |
|  |  | 289,495.29 | 107,910.19 | 482,683.42 | 132,908.34 | 429,685.13 | 121,913.45 | 40,498.58 | 35,753.05 |

FIG. 18G

| | DEC-14 | JAN-15 | FEB-15 | MAR-15 |
|---|---|---|---|---|
| | 0.00 | 0.00 | 0.00 | 0.00 |
| | 0.00 | 0.00 | 0.00 | 0.00 |
| | 0.00 | 0.00 | 0.00 | 0.00 |
| | 6,473.21 | 6,473.21 | 5,846.77 | 6,473.21 |
| | 0.00 | 0.00 | 0.00 | 0.00 |
| | 60,489.54 | 0.00 | 0.00 | 60,489.54 |
| | 3,780.60 | 0.00 | 0.00 | 3,780.60 |
| | 0.00 | 0.00 | 0.00 | 0.00 |
| | 29,488.65 | 22,683.58 | 0.00 | 0.00 |
| | 0.00 | 0.00 | 0.00 | 0.00 |
| | 0.00 | 0.00 | 0.00 | 0.00 |
| | 100,232.00 | 29,156.79 | 5,846.77 | 70,743.35 |

FROM FIG. 18G

Revenue Contract
Customer: ABC INC    Contract Value: 1,879,500.00    Revenue to Debit: 880,088.90    Unreleased Revenue: 873,317.73    Contract Asset: 190,588.90

Overview | Transactions | Waterfall | Accounting | Revenue Summary | Notes & Attachments | Approvals | Holds Period: Select Period Name To Filter [x] [v]    Interfaced: Please Select... [x] [v]    [Show Detail]

| Account Type | GL Account | Transactional Currency | Transactional Debit | Transactional Credit | Functional Debit | Functional Credit | Reporting Debit | Reporting Credit | Transferred |
|---|---|---|---|---|---|---|---|---|---|
| APR-14 (10 Items Displayed) | | | | | | | | | |
| COGS Capitalized | 100:00:1000:15800 | USD | 200,000.00 | 0.00 | 200,000.00 | 0.00 | 200,000.00 | 0.00 | N |
| Commission Accrued | 100:00:0000:15900 | USD | 0.00 | 8,893.95 | 0.00 | 8,893.95 | 0.00 | 8,893.95 | N |
| Contract Liability | 100:00:0000:22000 | USD | 289,495.29 | 689,500.00 | 289,495.29 | 689,500.00 | 289,495.29 | 689,500.00 | N |
| Revenue | 100:00:0000:40000 | USD | 0.00 | 226,835.77 | 0.00 | 226,835.77 | 0.00 | 226,835.77 | N |
| Revenue | 100:00:0000:42000 | USD | 0.00 | 17,353.56 | 0.00 | 17,353.56 | 0.00 | 17,353.56 | N |
| Revenue | 100:00:0000:43000 | USD | 0.00 | 5,670.89 | 0.00 | 5,670.89 | 0.00 | 5,670.89 | N |
| Revenue | 100:00:0000:43100 | USD | 0.00 | 7,500.00 | 0.00 | 7,500.00 | 0.00 | 7,500.00 | N |
| Revenue | 100:00:0000:43500 | USD | 0.00 | 32,135.07 | 0.00 | 32,135.07 | 0.00 | 32,135.07 | N |
| COGS | 100:00:0000:50100 | USD | 120,000.00 | 0.00 | 120,000.00 | 0.00 | 120,000.00 | 0.00 | N |
| Commission Expense | 100:00:0000:63500 | USD | 8,893.95 | 0.00 | 8,893.95 | 0.00 | 8,893.95 | 0.00 | N |
| | | | 618,389.24 | 1,107,889.24 | 618,389.24 | 1,107,889.24 | 618,389.24 | 1,107,889.24 | |
| MAY-14 (5 Items Displayed) | | | | | | | | | |
| Commission Accrued | 100:00:0000:15900 | USD | 107,910.19 | 0.00 | 107,910.19 | 0.00 | 107,910.19 | 0.00 | N |
| Contract Liability | 100:00:0000:22000 | USD | 0.00 | 17,932.01 | 0.00 | 17,932.01 | 0.00 | 17,932.01 | N |
| Revenue | 100:00:0000:42000 | USD | 0.00 | 89,978.18 | 0.00 | 89,978.18 | 0.00 | 89,978.18 | N |
| Revenue | 100:00:0000:43500 | USD | 3,002.30 | 0.00 | 3,002.30 | 0.00 | 3,002.30 | 0.00 | N |
| Commission Expense | 100:00:0000:63500 | USD | 110,912.49 | 0.00 | 110,912.49 | 0.00 | 110,912.49 | 0.00 | N |
| | | | 110,912.49 | 110,912.49 | 110,912.49 | 110,912.49 | 110,912.49 | 110,912.49 | |

Revenue Contract
Customer: ABC INC  Contract Value: 1,879,500.00  Unreleased Revenue: 873,317.73  Contract Asset: 190,588.90
Revenue to Debit: 880,088.90

Overview | Transactions | Waterfall | Accounting | Revenue Summary | Notes & Attachments | Approvals | Holds | Accounting Detail [X]

Period: [Select Period Name To Filter] [X] [>]   Interfaced: [Please Select ....] [X] [>]   Invoice Number: [Please Select ....] [X] [>]   Sales Order: [Please Select ....] [X] [>]

| Sales Order | Period Name | Sales Order Line Number | Accounting Segments | Currency Code | Debit | Credit | Functional Debit | Functional Credit | Reporting Debit | Reporting Credit |
|---|---|---|---|---|---|---|---|---|---|---|
| SO-100 | APR-14 | 1 | 100:00:1000:15900 | USD | 0.00 | 156.25 | 0.00 | 156.25 | 0.00 | 15 |
| SO-100 | APR-14 | 1 | 100:00:0000:63500 | USD | 156.25 | 0.00 | 156.25 | 0.00 | 156.25 | 0.00 |
| SO-100 | APR-14 | 1 | 100:00:0000:43000 | USD | 0.00 | 5,670.89 | 0.00 | 5,670.89 | 0.00 | 5,67 |
| SO-100 | APR-14 | 1 | 100:00:0000:22000 | USD | 5,670.89 | 0.00 | 5,670.89 | 0.00 | 5,670.89 | 0.00 |
| SO-100 | APR-14 | 1 | 100:00:0000:22000 | USD | 0.00 | 10,000.00 | 0.00 | 10,000.00 | 0.00 | 10,00 |
| SO-100 | JUN-14 | 2 | 100:00:0000:15900 | USD | 0.00 | 737.70 | 0.00 | 737.70 | 0.00 | 73 |
| SO-100 | JUL-14 | 2 | 100:00:0000:15900 | USD | 0.00 | 762.30 | 0.00 | 762.30 | 0.00 | 76 |
| SO-100 | APR-14 | 2 | 100:00:0000:15900 | USD | 0.00 | 737.70 | 0.00 | 737.70 | 0.00 | 73 |
| SO-100 | MAY-14 | 2 | 100:00:0000:15900 | USD | 0.00 | 762.30 | 0.00 | 762.30 | 0.00 | 76 |
| SO-100 | AUG-14 | 2 | 100:00:0000:15900 | USD | 0.00 | 737.70 | 0.00 | 737.70 | 0.00 | 73 |
| SO-100 | SEP-14 | 2 | 100:00:0000:15900 | USD | 0.00 | 762.30 | 0.00 | 762.30 | 0.00 | 76 |
| SO-100 | JUN-14 | 2 | 100:00:0000:63500 | USD | 737.70 | 0.00 | 737.70 | 0.00 | 737.70 | 0.00 |

Revenue Contract
Customer: ABC INC   Contract Value: 1,879,500.00   Revenue to Debit: 880,088.90   Unreleased Revenue: 873,317.73   Contract Asset: 190,588.90

Overview | Transactions | Waterfall | Accounting | Notes & Attachments | Revenue Summary | Approvals | Holds | Accounting Detail [X]

Search ▼ [Enter search text here... X] [🔍]

| Type | APR-14 | MAY-14 | JUN-14 | JUL-14 | AUG-14 | SEP-14 | OCT-14 | NOV-14 | DEC-14 | JAN-15 | FEB-15 | MAR-15 |
|---|---|---|---|---|---|---|---|---|---|---|---|---|
| Billing | 689,500.00 | 0.00 | 0.00 | 0.00 | 0.00 | 0.00 | 0.00 | 0.00 | 0.00 | 0.00 | 0.00 | 0.00 |
| Revenue | 289,495.29 | 107,910.29 | 482,683.42 | 24,405.22 | 24,405.22 | 23,617.94 | 6,473.21 | 6,264.40 | 6,473.21 | 6,473.21 | 5,846.77 | 6,473.21 |
| Contract Liability | 400,004.71 | 292,094.52 | 0.00 | 0.00 | 0.00 | 0.00 | 0.00 | 0.00 | 0.00 | 0.00 | 0.00 | 0.00 |
| Contract Assets | 0.00 | 0.00 | 190,588.90 | 190,588.90 | 190,588.90 | 190,588.90 | 190,588.90 | 190,588.90 | 190,588.90 | 190,588.90 | 190,588.90 | 190,588.90 |
| Std Cost | 120,000.00 | 0.00 | 0.00 | 0.00 | 0.00 | 0.00 | 0.00 | 0.00 | 0.00 | 0.00 | 0.00 | 0.00 |
| Commission | 8,893.95 | 3,002.30 | 13,729.26 | 823.45 | 823.45 | 796.88 | 61.15 | 59.18 | 61.15 | 61.15 | 55.23 | 61.15 |
| Impairment | 0.00 | 0.00 | 0.00 | 0.00 | 0.00 | 0.00 | 0.00 | 0.00 | 0.00 | 0.00 | 0.00 | 0.00 |
| VC Adjustment | 0.00 | 0.00 | 0.00 | 0.00 | 0.00 | 0.00 | 0.00 | 0.00 | 0.00 | 0.00 | 0.00 | 0.00 |

FIG. 18J

SYSTEM AND METHOD FOR RECOGNIZING REVENUE AND MANAGING REVENUE LIFECYCLES

CROSS-REFERENCE TO RELATED APPLICATIONS

The present application is a continuation of U.S. patent application Ser. No. 17/147,221, filed Jan. 12, 2021 and entitled "System and Method for Recognizing Revenue and Managing Revenue Lifecycles," now U.S. Pat. No. 11,887,198, which is a continuation of U.S. patent application Ser. No. 16/216,934, filed Dec. 11, 2018 and entitled "System and Method for Recognizing Revenue and Managing Revenue Lifecycles," now U.S. Pat. No. 10,891,697, which is a continuation of U.S. patent application Ser. No. 15/003,593, filed Jan. 21, 2016 and entitled "System and Method for Recognizing Revenue and Managing Revenue Lifecycles," now U.S. Pat. No. 10,152,755, which claims the benefit of U.S. Provisional Patent Application Ser. No. 62/106,095, filed Jan. 21, 2015 and entitled "Novel Approach to Meeting Global Financial Standards," which are hereby incorporated by reference herein.

FIELD

This disclosure, in a broad sense, is directed toward a system, method and apparatus for accurately determining an entity's financial position. More specifically, this disclosure relates to accurately identifying revenues for recognition.

BACKGROUND

Entities and organizations must understand their financial positions, as well as be able to accurately report such information to appropriate parties, shareholders, owners, etc. However, as the number and complexity of transactions and agreements for a company grows, it can become increasingly difficult to do this accurately.

A report can consist of, for example, a financial statement. The general purpose of financial statements is to provide information about the financial position, performance and changes in financial position of an enterprise that are useful to a wide range of users in making economic decisions. According to the Financial Accounting Standards Board (FASB), "a statement of financial position provides information about an entity's assets, liabilities, and equity and their relationships to each other at a moment in time."

One aspect of financial reporting is detailing when an organization may recognize the revenue it has acquired. Generally, revenues are not recognized until they are earned or in other words, "realized." According to FASB guidelines, "revenues are considered to have been earned when the entity has substantially accomplished what it must do to be entitled to the benefits represented by the revenues." The general concept behind these guidelines is to "recognize revenue to depict the transfer of promised goods or services to customers in an amount that reflects the consideration to which the entity expects to be entitled in exchange for those goods or services."

The FASB identifies five steps that an entity must follow to recognize revenue: (1) identify the contract with a customer; (2) identify the performance obligations (promises) in the contract; (3) determine the transaction cost or "fair value"; (4) allocate the transaction price to the performance obligations in the contract; and (5) recognize revenue when (or as) the entity satisfies a performance obligation. For an entity having large numbers of transactions and agreements of differing types and complexity, accurately and quickly recognizing revenue can be extremely challenging. Currently, there are no systems or methods available which can adequately meet these challenges. Thus, there is room for improvement in the art.

BRIEF DESCRIPTION OF THE DRAWINGS

Implementations of the present application will now be described, by way of example only, with reference to the attached Figures, wherein:

FIG. 2 illustrates an example user interface for customizing aspects of a performance obligation;

FIG. 3 illustrates an example user interface for accounting for and reporting costs;

FIG. 4 illustrates an example user interface for assigning variable consideration;

FIG. 5 illustrates an example user interface for configuring various forecasting options within a performance obligation template of this disclosure;

FIG. 6 illustrates a user interface displaying a hierarchy of rules and conditions according to an embodiment of this disclosure;

FIG. 7 illustrates a user interface providing functionality for customizing variable consideration parameters;

FIG. 8 illustrates a user interface for applying multiple variable consideration parameters;

FIG. 9 illustrates a user interface displaying a variable consideration template;

FIG. 10 illustrates an example user interface in accordance with an embodiment of this disclosure;

FIGS. 11-12 illustrate cost template windows within example user interfaces in accordance with one or more embodiments of this disclosure;

FIG. 13 illustrates another user interface within this disclosure;

FIG. 16 illustrates an example workbench user interface in accordance with an embodiment of this disclosure;

FIGS. 18A-J illustrate additional user interfaces of the workbench module;

DETAILED DESCRIPTION

Figure 1:
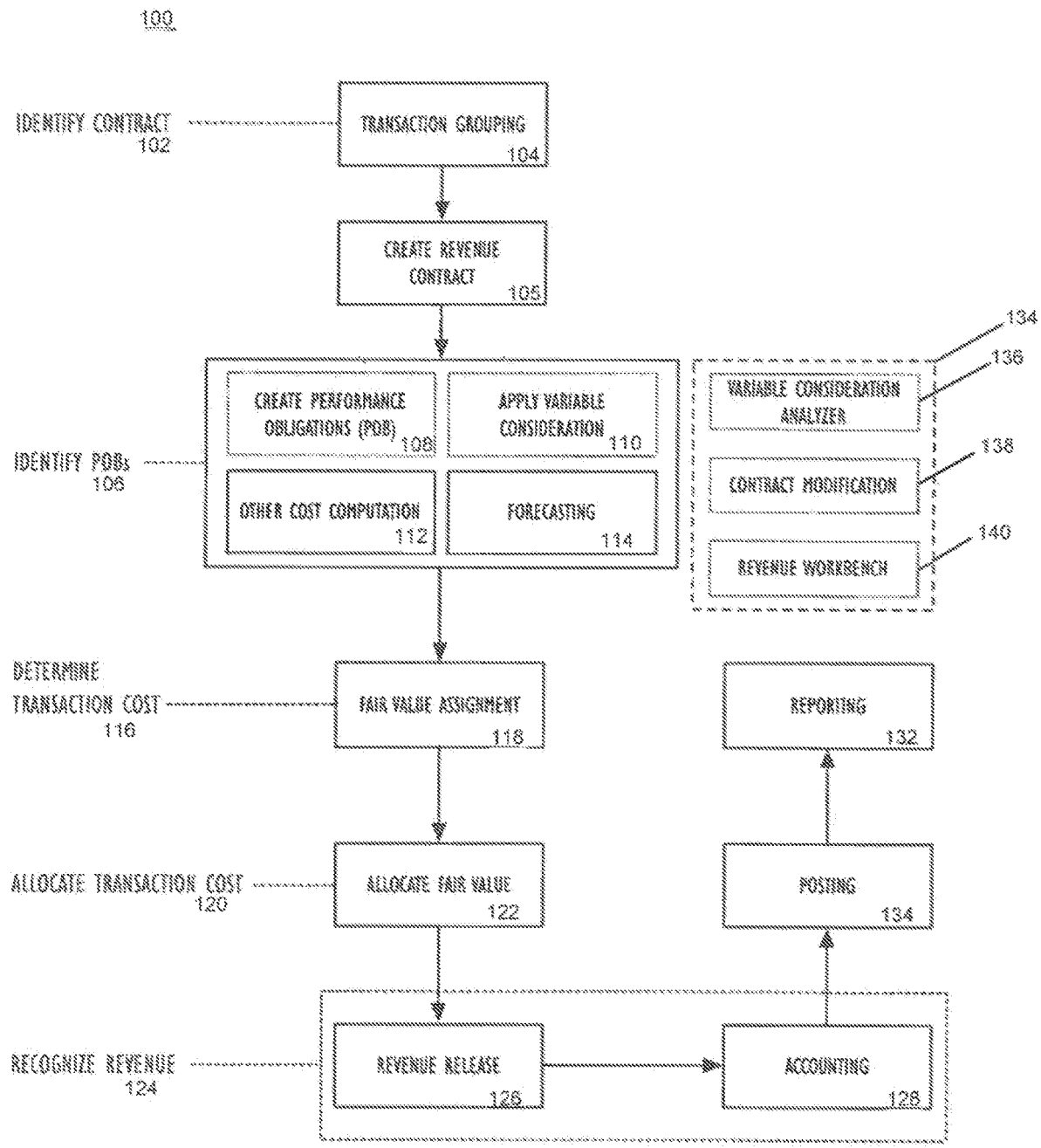
FIG. 1 illustrates a method 100 of recognizing revenue in accordance with an embodiment of this disclosure.

It will be appreciated that for simplicity and clarity of illustration, where appropriate, reference numerals have been repeated among the different figures to indicate corresponding or analogous elements. In addition, numerous specific details are set forth in order to provide a thorough understanding of the implementations described herein. However, it will be understood by those of ordinary skill in the art that the implementations described herein can be practiced without these specific details. In other instances, methods, procedures and components have not been described in detail so as not to obscure the related relevant feature being described. Also, the description is not to be considered as limiting the scope of the implementations described herein.

Aspects of this disclosure can take the form of hardware elements, software elements or elements containing both hardware and software. In one implementation, the software portions can include, but are not limited to, firmware, resident software, microcode, etc. Furthermore, these software portions can take the form of a computer program product accessible from a computer-usable or computer-readable medium providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device. The medium can be an electronic, magnetic, optical, electromagnetic, infrared, or semiconductor system (or apparatus or device) or a propagation medium (though propagation mediums in and of themselves as signal carriers are not included in the definition of physical computer-readable medium). Examples of a physical computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD. Both processors and program code for implementing each as aspect of the system can be centralized or distributed (or a combination thereof) as known to those skilled in the art.

Aspects of this disclosure can include a data processing system suitable for storing program code and for executing program code, which can be implemented in any of the above-referenced devices described herein, can include at least one processor communicatively coupled directly or indirectly to a memory through a system bus. The memory elements can include local memory employed during actual execution of the program code, bulk storage, and cache memories that provide temporary storage of at least some program code in order to reduce the number of times code must be retrieved from bulk storage during execution. I/O devices (including but not limited to keyboards, displays, pointing devices, etc.) can be communicatively coupled to the system either directly or through intervening I/O controllers.

Aspects of this disclosure are directed to complying with accounting standards, such as those set forth in "FASB Accounting Standards Update, No. 2014-09, May 2014," the contents of which are entirely incorporated by reference herein.

Several definitions that apply throughout this document will now be presented. The word "module" can include software or firmware having a particular purpose, and/or the system(s) running the module. The terms "processor" and "processing unit" are defined as a component or a group of components that are capable of receiving input signals, or other data, processing those signals and selectively signaling other components to respond to such input or data. The term "electronic device" includes, but is not limited to, devices such as computers, personal computers, laptop computers, smart phones and PDAs. The term "revenue contract" includes "a grouping of one or more transactions for revenue accounting purpose as per applicable accounting guidelines or user policy." The term "user" includes, but is not limited to, client devices used to implement aspects of this disclosure, and persons using such devices. The term "performance obligation" includes a promise in a contract to transfer a good or service (to a customer, for example). The term "client device" includes one or more electronic devices which can communicate with systems of this disclosure, receive information from one or more systems of this disclosure, or transmit information to such systems.

An embodiment within this disclosure can include a revenue management module for managing the timing, amount and amortization method of revenue recognition. The embodiment can also enable users to manage cost of goods sold, commissions, rebates, accruals and royalties, and the like. A revenue management model can be adaptable and customizable for the needs and circumstances of a particular entity. A revenue management model can be configured in accordance with an entity's revenue policies and business rules in order to track revenue and facilitate automated revenue recognition.

An embodiment can include a revenue allocation module which can automate calculations, such as the 'Fair Value' calculation (VSOE, TPOE, BESP) as set forth in relevant accounting guidelines. A revenue allocation module can perform revenue allocations required under appropriate accounting standards, rules, and regulations. A revenue allocation module can automatically allocate and track all calculations at a transaction level, thereby giving transparency and traceability to the expected adjustments. Automated allocation and tracking of calculations at a transactional level can facilitate the presentation and analysis of useful revenue data than allowed using traditional methods, such as complex spreadsheets, for example.

An embodiment of this disclosure can include a revenue forecasting module which can deliver a large compliment of operational reports, such as those which are required at the ends of financial periods. A financial period can be a month, a quarter or a year, or a combination of these three, for example. A revenue forecasting module can be used to generate reconciliation reports and revenue waterfalls, for example. Such reports can be beneficial during financial analysis of an organization, such as during an audit, for example.

An embodiment can further include a revenue intelligence module. A revenue intelligence module can enhance the operational reporting capabilities of institutions. A revenue intelligence module can provide performance analytics dashboards on the display of an electronic device. Such a module can thus provide key decision makers with timely and accurate revenue visibility and metrics. The revenue intelligence module can render useable information on pre-formatted, user-customizable, reports and/or dashboards.

From the time an agreement for services or products is reached, until the time performance by all parties is completed, revenue accounting is affected at each stage. Companies need accurate revenue information throughout the revenue accounting life cycle. At least one embodiment of this disclosure is a system and method to identify and extract all required information from source systems, such as external data sources and externally executed programs, to accurately track and report revenue throughout revenue accounting life cycles.

FIG. 1 illustrates a method 100 of recognizing revenue. Method 100 can begin by identifying 102 one or more contracts for analysis. Identifying contracts 102 can include grouping 104 of transactions. Once contracts are properly identified 102 and/or transactions appropriately grouped 104, the method 100 can proceed to block 106, at which performance obligations (POBs) are identified. Identification of performance obligations can entail creating or modifying/deleting 108 POBs, applying variable consideration 110, calculation of other costs 112 associated with the POB, and applying forecast rules 114. The method 100 can then proceed to block 118. At block 118 transactions costs (associated with a POB) are determined 116 and a fair value of the transaction or a fair value of aspects of the transaction(s) is assigned 118. Method 100 then moves to block 122. At block 122 transactions costs are allocated 120 according to a fair market value. Once fair market values have been allocate 122, the method proceed to block 124, in which revenue is recognized. Recognizing revenue 124 can involve releasing 126 revenue and accounting 128 for revenue. Thereafter, the method 100 proceeds to block 130, in which recognized revenue is posted. Once recognized revenue is posted 130, the method 100 proceeds to block 132, in which recognized revenue is reported. Although steps of the method 100 are provided in a certain order, it will be understood that a different order, involving the same, additional or fewer steps, can be implemented in one or more embodiments within this disclosure.

Also illustrated in FIG. 1 are various functionalities 134 which can be provided by one or more systems of this disclosure, and aspects of which can be applied and/or utilized as part of method 100. The functionalities, which are described in greater detail below, include, but are not limited to, a variable consideration analyzer 136, contract modification 138, and a revenue workbench 140, SSP Analyzer, Mass Actions, Netting Process, each of which can be comprised within one or more modules. An SSP Analyzer can incorporate a unique calculation which identifies appropriate SSP when provided a set of transactions. Mass actions is a method used to perform various actions on one or more transactions/data within the software. Netting Process is a method to perform accounting adjustments as per revenue accounting guidelines (ASC 606/IFRS 15). As noted above, in at least one embodiment of this disclosure, a performance obligation can be a promise in a contract with a customer to transfer a good or service to the customer. Appropriate accounting guidelines require that if an entity promises to transfer more than one good or service, the entity should account for each promised good or service as a separate POB only if it is distinct. An embodiment of this disclosure can include a POB configurator, which consists of preconfigured setups related to how a POB can be defined by providing details such as how revenue can be released; how revenue can be recognized based on the various ratable methods; how to override the release events; whether a POB can be released/applied manually (as opposed to automatically); how cost can be treated for a POB in a manner similar to revenue; defining forecasting at a POB level; and assigning Variable Consideration (VC) at another level of computation apart from transaction line level, such as a POB level. Such preconfigured setups can be included in one or more templates.

Figure 2:
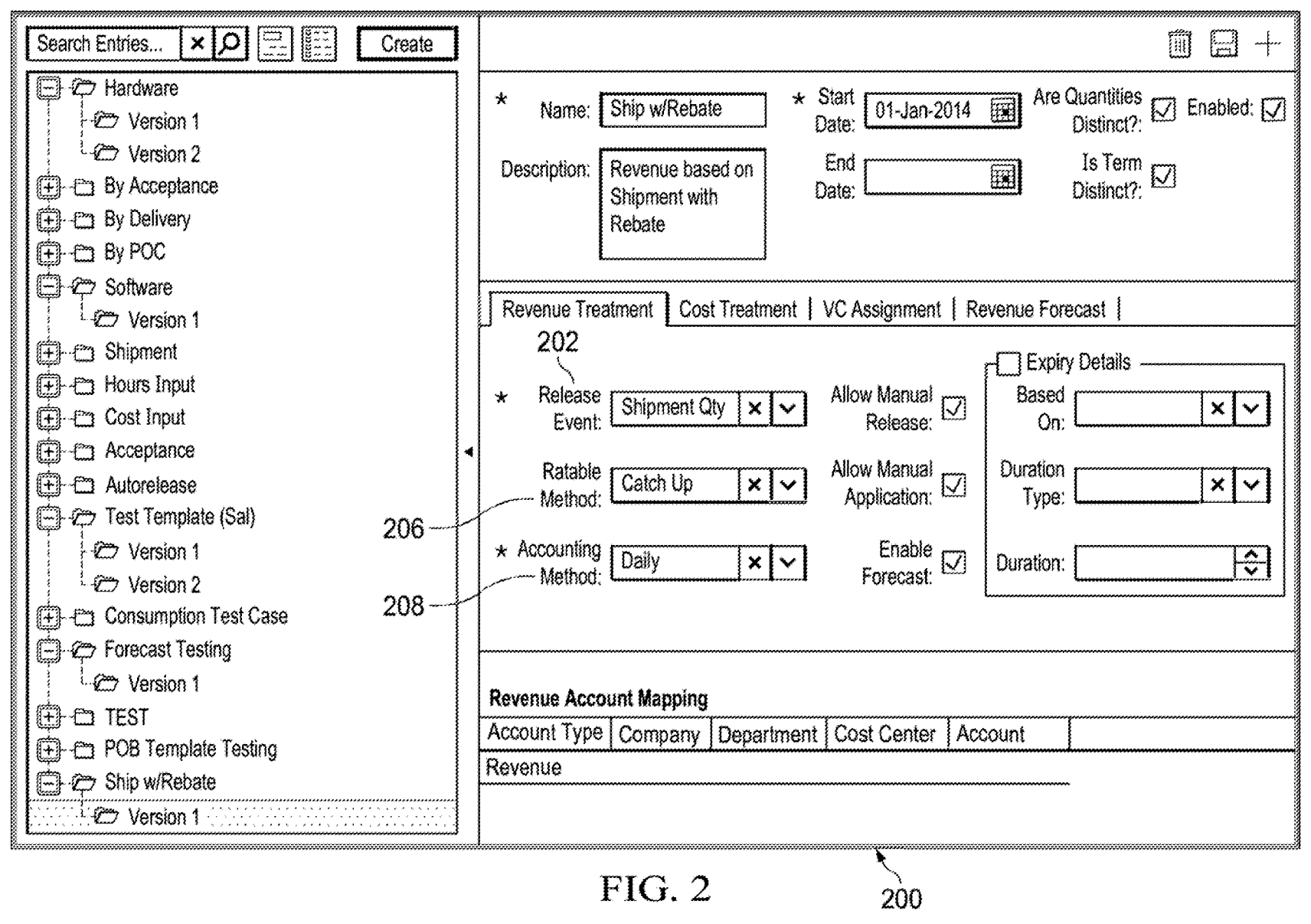

FIG. 2 illustrates an example user interface (UI) 200 for customizing aspects of a POB. As shown, a user can specify a particular release event 202, a particular ratable method 204, and a particular accounting method 206. In order to enable accounting for each promised good or service as a separate POB (as when they are distinct), a user can indicate that the relevant quantities are distinct 208 and/or that the term of the POB has a distinct term 210.

Figure 3:
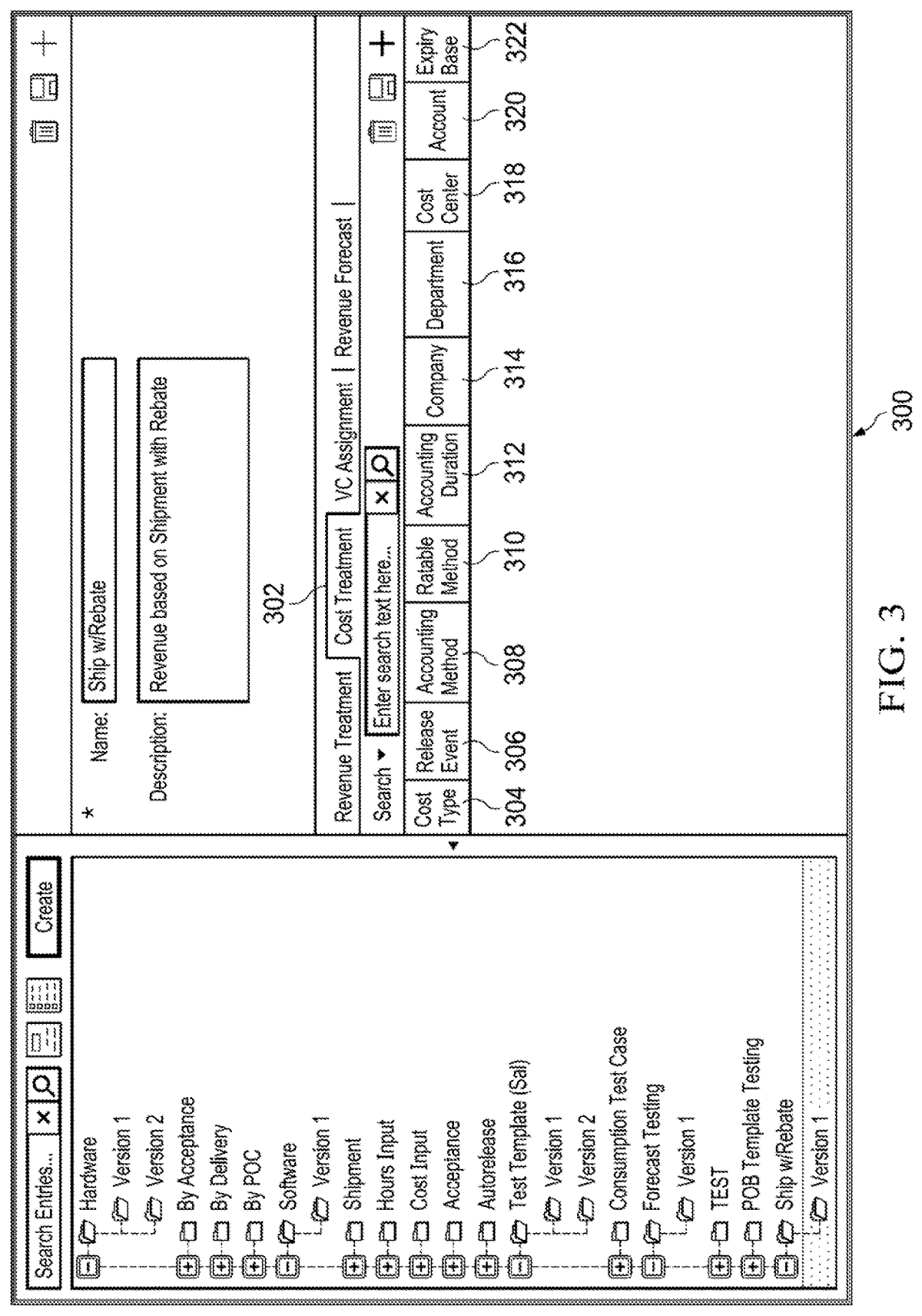

FIG. 3 illustrates an example UI 300 which enables a cost to be accounted for and reported at a POB level. In at least one embodiment, an application can also account for details related to a cost at a POB level. Thus, under the cost treatment tab 302, information such as cost type 304, release event 306, accounting method 308, ratable method 310, accounting duration 312, company 314, department 316, cost center 318, account (identifier) 320, and expiry base 322 can be displayed.

Figure 4:
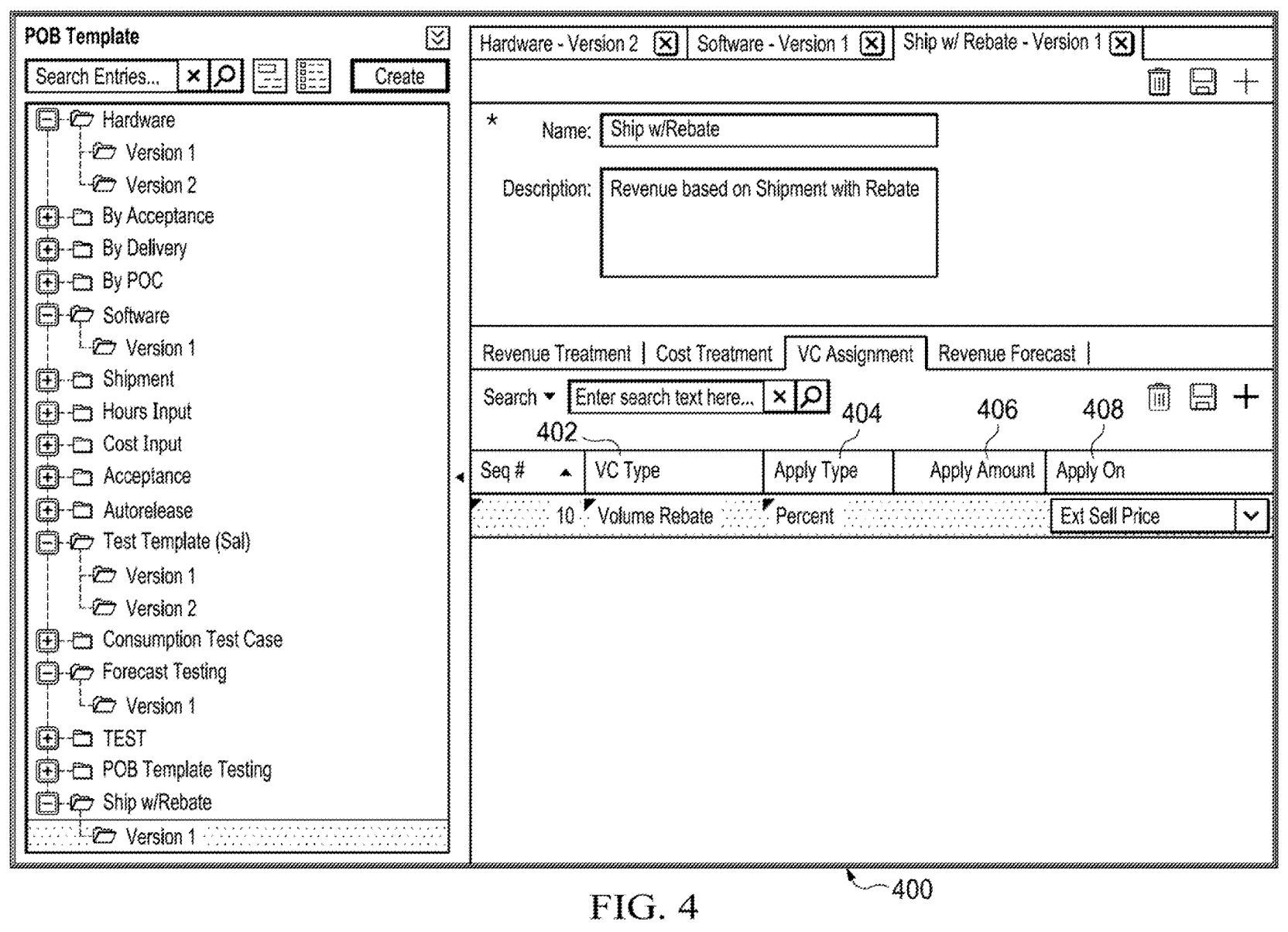

FIG. 4 illustrates an example UI 400 for assigning variable consideration (VC) at a POB level. As shown, the VC type 402, application type 404, the amount to apply 406, and the triggering event 408 for applying the VC assignment can be specified.

FIG. 5 illustrates an example UI 500 for configuring various forecasting options within a POB template. Under revenue forecast tab 502 there can be seen a date hierarchy window 504 and a schedules window 506. As illustrated, the date hierarchy window 504 enables selection of an appropriate adjustment period 508. The schedules window 506 enables the anticipated revenue recognition schedule to be customized.

Figure 6:
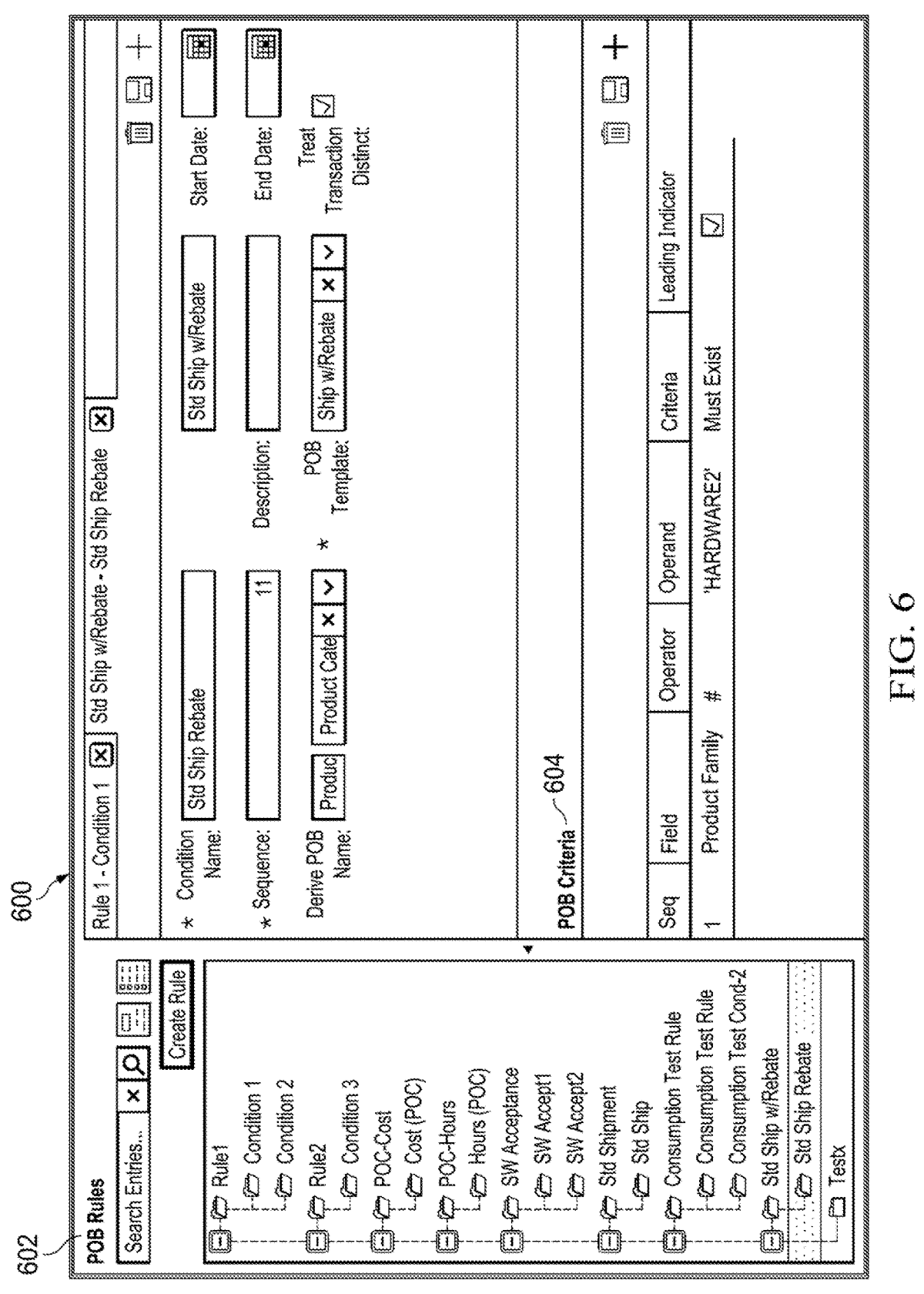

In an embodiment of this disclosure, POB rules are defined to associate transaction lines in a revenue contract to a POB template (see FIGS. 2-5). A user can be provided the ability to configure POB rule conditions. Users can also be provided with criteria filters, which enable users to define their own criteria in order to meet the needs of their particular business or situation. A POB rule can have multiple conditions for associating transaction lines to a POB template. A condition, in turn, can have primary and secondary criteria filters, thereby making the condition more robust. Rules and conditions are applied on the transactions lines based on the sequence associated with the transactions lines. In one embodiment, once a transaction line has met a certain rule-defined criteria, no additional rules are applied to the transaction line. FIG. 6 illustrates a UI 600 displaying a hierarchy 602 of rules and conditions. As shown, a POB criteria window 604 of the UI 600 can enable user-selection of a leading indicator.

Figure 8:
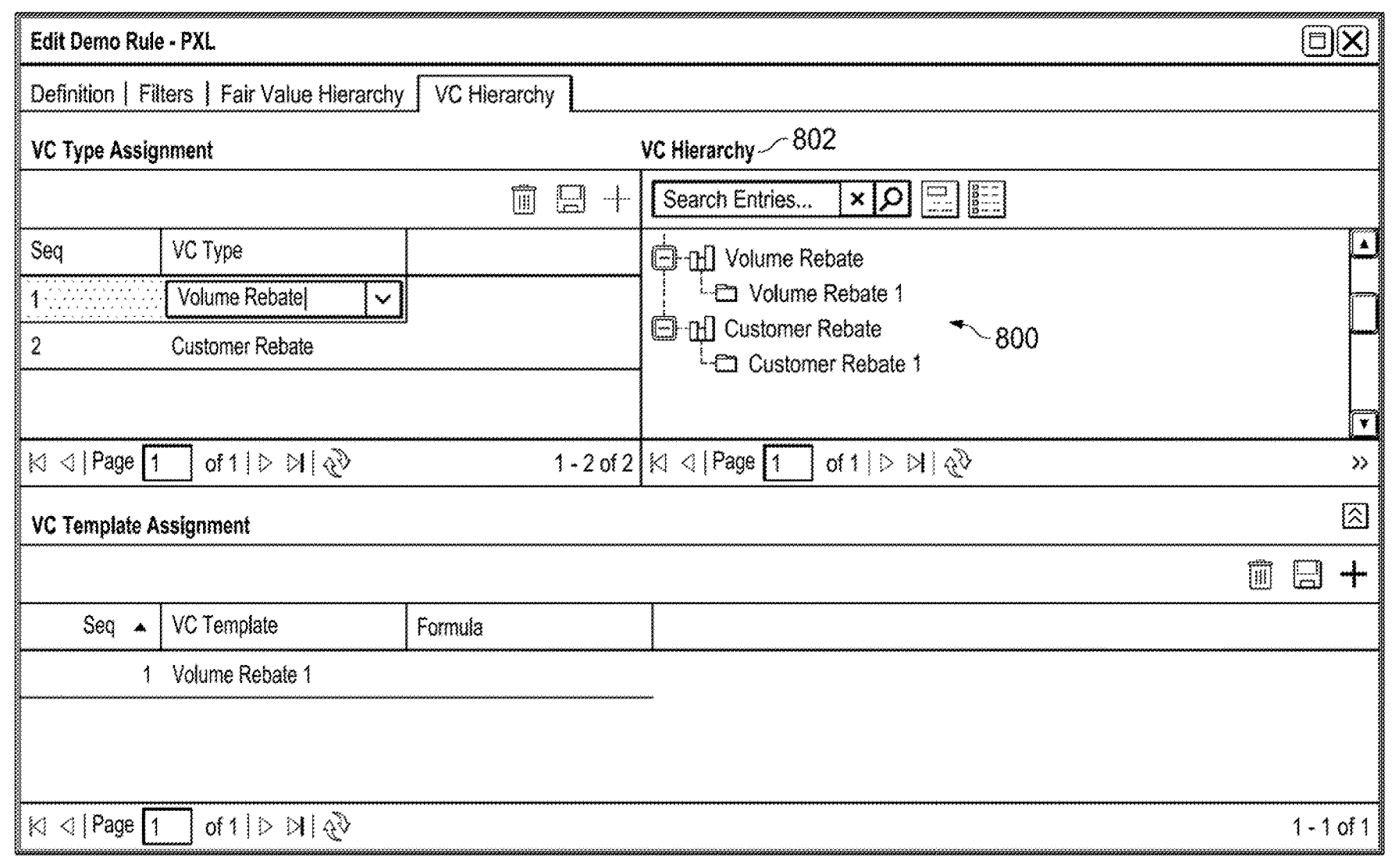

As intimated above, aspects of this disclosure pertain to determination of variable consideration (VC). According to relevant accounting rules, if the promised amount of consideration in a contract is variable, an entity should estimate the transaction price by using either the expected value (that is, probability-weighted amount) or the most likely amount, depending on which method is a better indicator. Within this disclosure, VCs can be defined and assigned at a POB level or at a transaction level (depending on the needs of the situation). A VC configurator module can consist of a VC type module, a VC stratification(s) module, and a VC upload module. With regard to the VC type module, an organization can setup various VC types based on their business model. An embodiment can include a user interface to help business users in configuring multiple VCs types. An embodiment can provide the ability to define the computation method of a VC, and define how to account for the VC amounts as and when they are applied. FIG. 7 illustrates how a user can be given multiple options of how a VC can be configured to impact specific amounts such as revenue 702 or allocated amounts 704, and impact how to compute 706 the VC (based on a Gross or Net basis). FIG. 8 shows how a transaction line can have multiple VCs 800 applied. As illustrated, if multiple VCs 800 exist, they are applied in a hierarchical matter 802. A VC stratification configures how a VC type is applied on transaction lines. A VC stratification specifies an apply type (which includes option to apply a given VC by percent or by amount).

Figure 9:
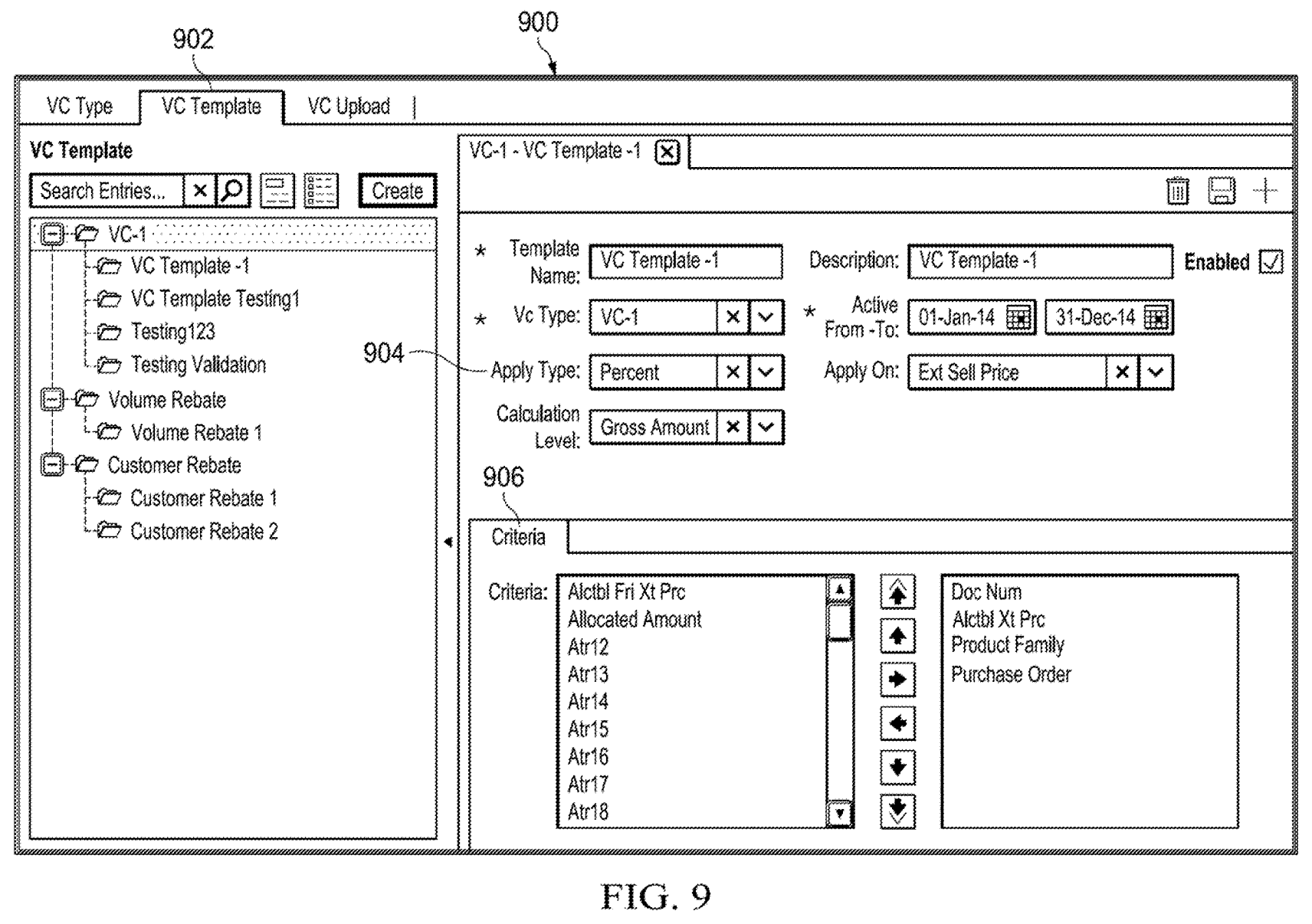

FIG. 9 illustrates a UI 900 having an example VC stratification window 902. The window 902 allows a user to specify an "apply type" 904 (in this case "percent") and to specify a "calculation level" (gross amount). UI 900 also includes a criteria window 906. The criteria window 906 is used to identify which transaction lines are eligible for VC assignment based on the criteria defined and mapped to a given POB. Uploading of VC information can be achieved either manually or automatically.

As noted above with regard to FIG. 1, POB identification can involve calculation of other costs. According to applicable accounting guidelines, incremental costs of obtaining and fulfilling a contract with a customer are to be capitalized and amortized on a systematic basis consistent with the pattern of the transfer of the goods or services to which the asset relates. In addition to being able to account for standard costs like product cost, embodiments of this disclosure enable accounting for other costs (such as commissions, royalties, etc.) This additional capability can enable users to track different types of costs associated with a transaction and determine how those costs. At least one embodiment addresses the issue of changing costs, as in for example, estimated cost versus actual cost realized, as well as offline cost calculations.

FIG. 10 illustrates a UI 1000 having a cost type window 1002. The cost type window 1002 provides a method to define multiple costs that an organization needs to account for as part of their revenue contracts with customers. As part of the cost type configuration, users can define the GL accounts for the cost entry as well as designate which costs should be included as part of standard margin 1004.

Figure 11:
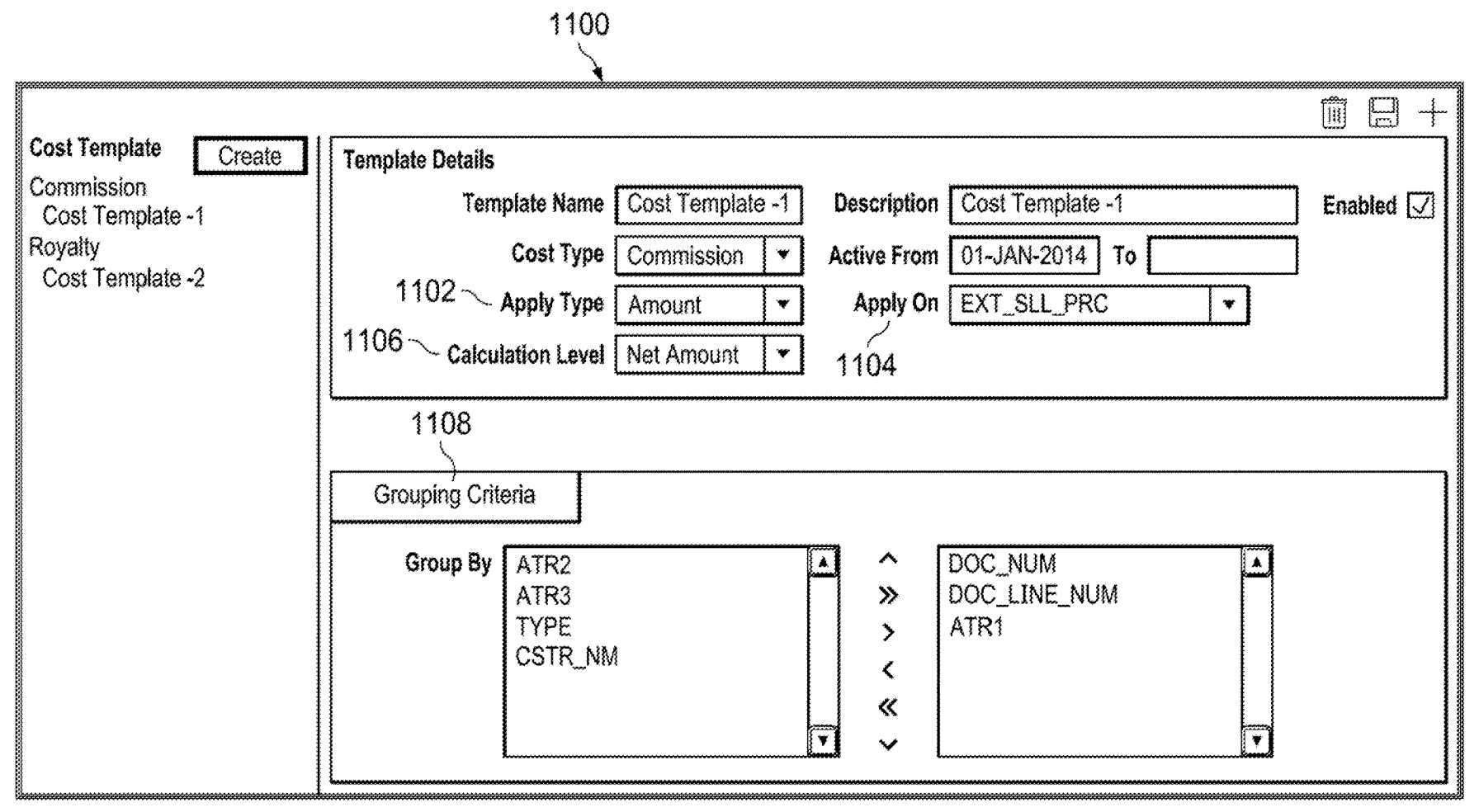

FIG. 11 illustrates a cost template window 1100. The cost template window 1100 can be used to define how a cost (other costs) is be calculated based on a transaction/product characteristics The window 1100 includes options for electing to apply cost type by percent or by amount ("apply type" 1102), dynamically deriving the value and computing other cost types ("apply on" 1104). The "apply on" menu is useful because a transaction line can have multiple fields storing amounts. A "calculation level" 1106 enables a user to elect either gross or net level. A criteria window 1108 is used in identifying which lines are eligible for a cost calculation based on criteria defined and mapped.

Figure 12:
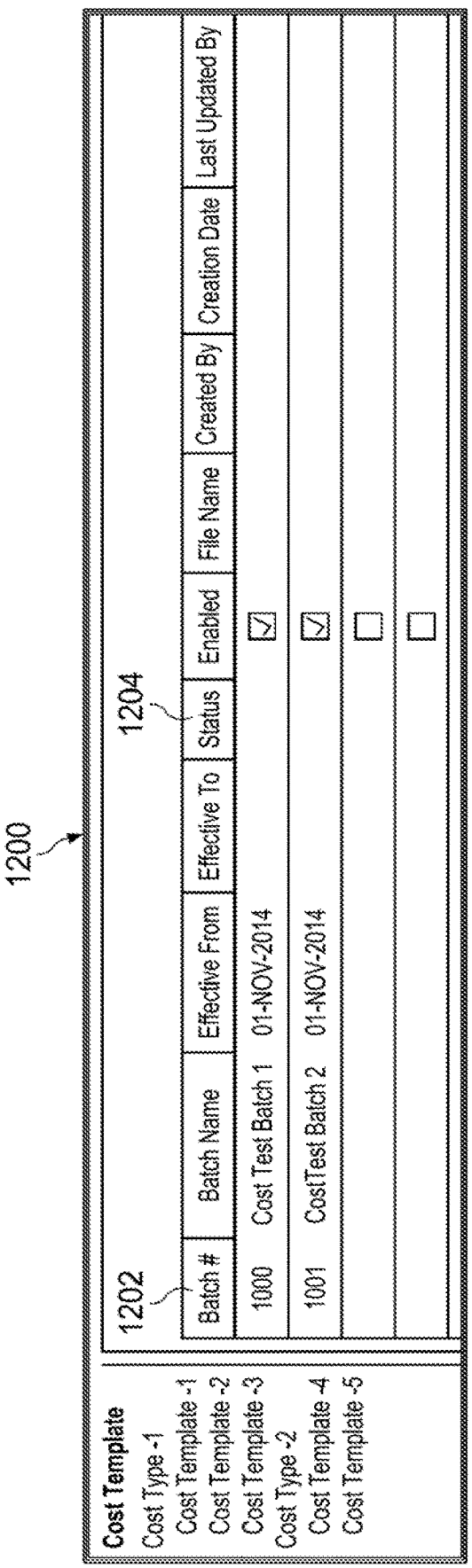

FIG. 12 illustrates a second cost template window 1200. Actual percentages or amounts, as defined by the cost template, can be uploaded into the system based on which other costs are being computed. To support an upload, the system provides the flexibility to create a batch 1202 and upload the file for calculation, thereby providing the status 1204 of an upload and any further processing as needed.

Figure 13:
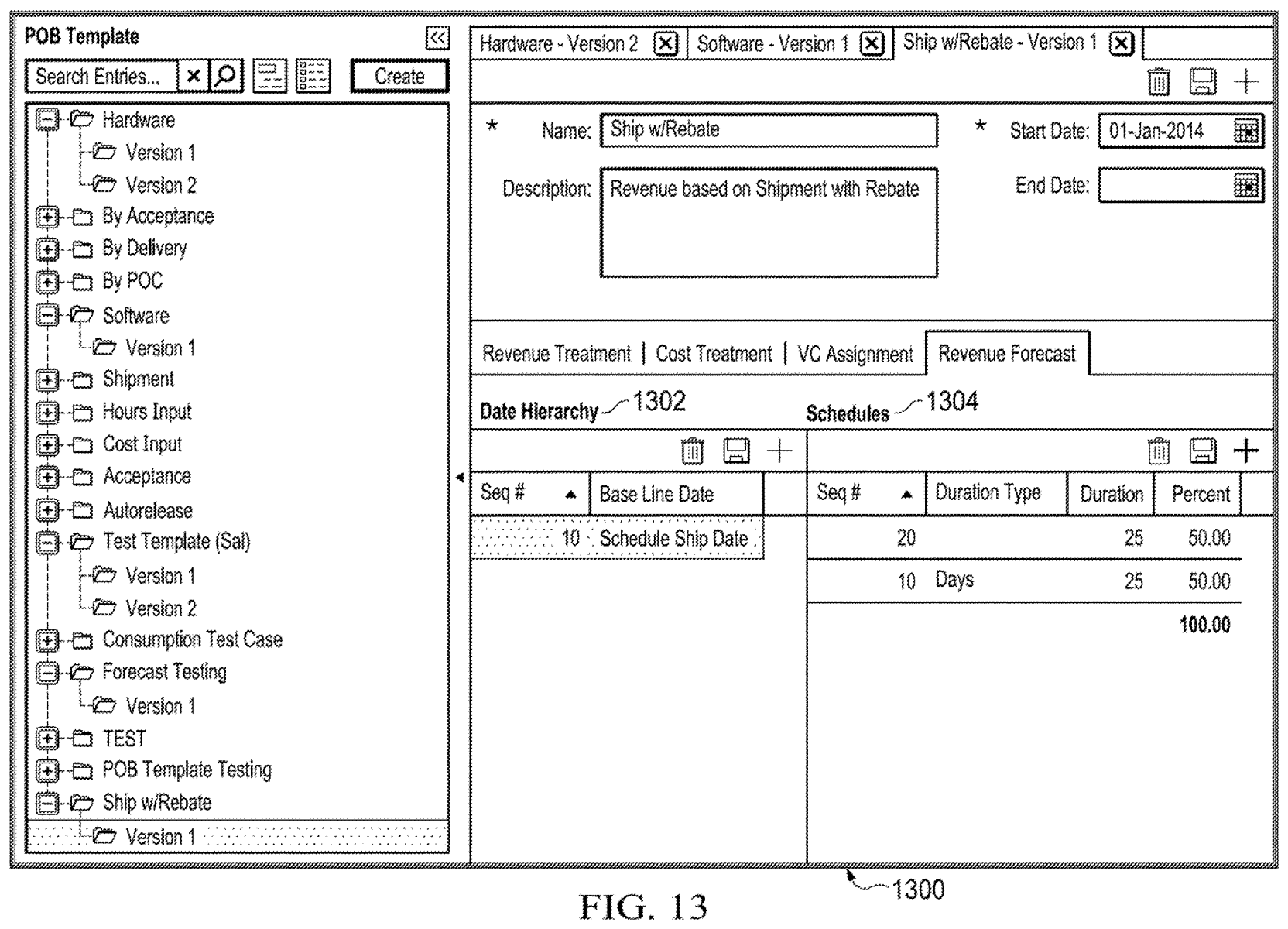

At least one embodiment of this disclosure enables robust and configurable forecasting. Forecasting helps in estimating future revenue outcomes of a transaction or a POB. FIG. 13 illustrates a UI 1300 for this purpose. As shown in FIG. 13, a forecast hierarchy 1302 and a forecast schedule 1304 can be configured at a POB level and then further applied to all lines associated with the relevant POB. Waterfall reports can also be provided to show revenue projections. Multiple date hierarchies 1302 can be configured and a schedule 1302 can be associated therewith, as shown.

As noted above, at least one aspect of this disclosure pertains to a variable consideration (VC) manager module. A VC manager module can include comprise a VC calculator module and a VC analyzer module.

Figure 14:
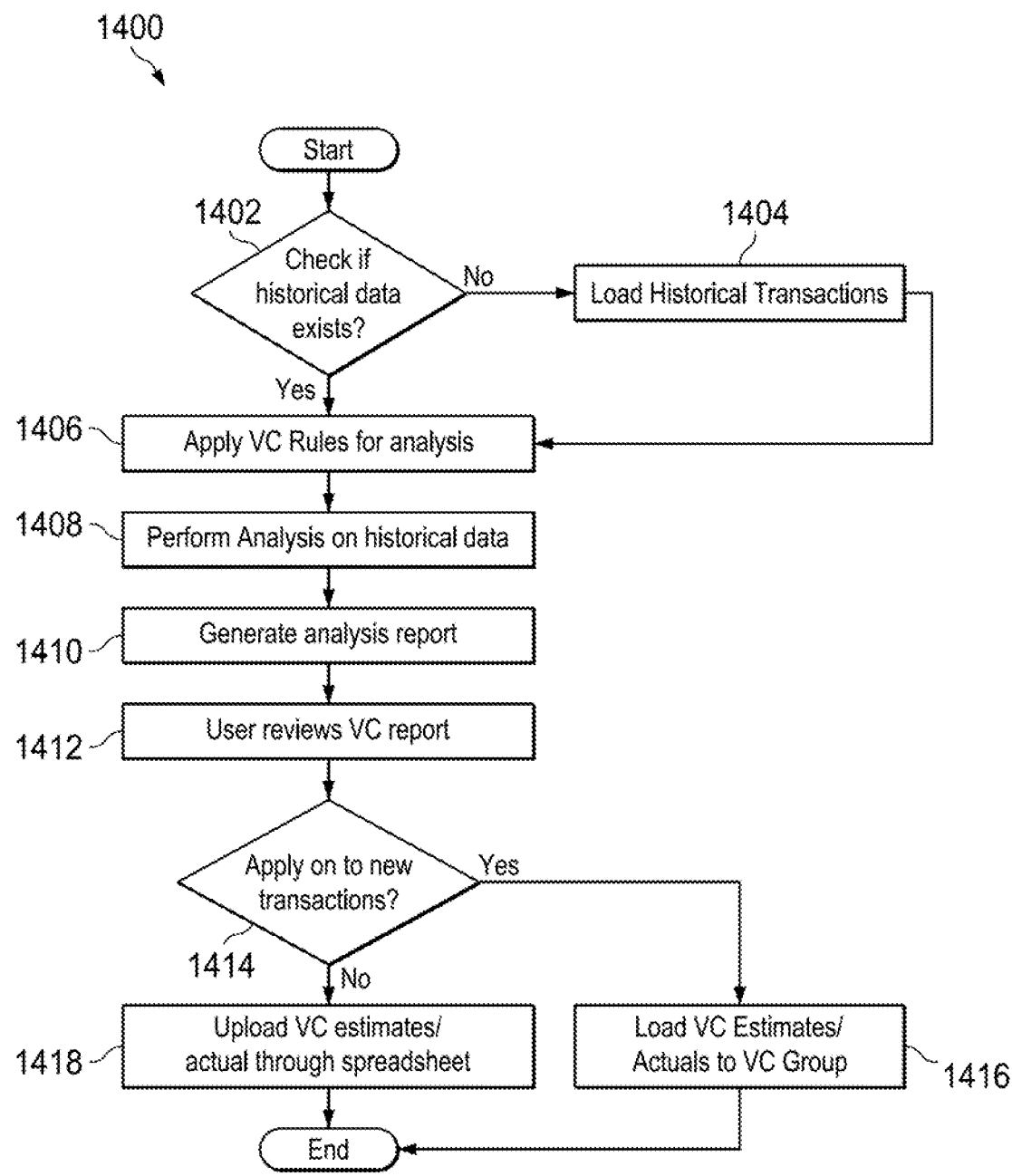
FIG. 14 illustrates a method of calculating variable consideration in accordance with an embodiment of this disclosure.

FIG. 14 illustrates a method 1400 carried out by a VC calculator module. A VC calculator can enable users to: derive VC estimates based on historical data; define stratification parameters to analyze historical data; define date range to analyze historical data; decide whether to include or exclude "one off" transactions; run different tiers of stratifications to compare; and approve stratifications to be used in transaction price adjustments. At block 1402 the system checks for the existence of historical data. If no such data exists, the historical transactions are loaded 1404. The system then applies variable consideration rules 1406 to the historical data. The method 1400 then proceeds to block 1408 in which analysis of historical data is performed. An analysis report can then be generated 1410. The method proceeds thereafter to block 1412, in which such report is rendered or displayed for user viewing. Based on the results of the report, a determination 1414 can be made as to whether to apply the variable consideration rules to new transactions. If the answer is 'yes,' variable consideration (VC) estimates and variable consideration 'actuals' can be loaded 1416 into a VC group for subsequent use. If the answer is 'no,' such information can be loaded 1418 by other means, such as one or more spreadsheets. The method 1400 can then end.

A VC analyzer resolves the issues that arise when estimates of VC were provided during the prior periods and were applied to the transactions, however, after a certain period, actual costs are provided or estimates contained incorrect values. A VC analyzer can help identify all impacted transactions (BULK/Transaction Level Processing) due to the change and apply the correct values across all the transactions or a specific transaction. The system will automatically, reallocate all the transaction lines by reallocating the transaction price in the revenue contract and perform retrospective/prospective accounting. A VC analyzer can allow users to analyze, manage and adjust existing VCs on transactions. A VC analyzer can provide users with the ability to analyze VCs applied on transactions. A VC analyzer can also: provide mass updates to adjust them based on actuals or new estimates; provide upload option to load actual costs; and generate reports used to analyze VC amounts.

Figure 15:
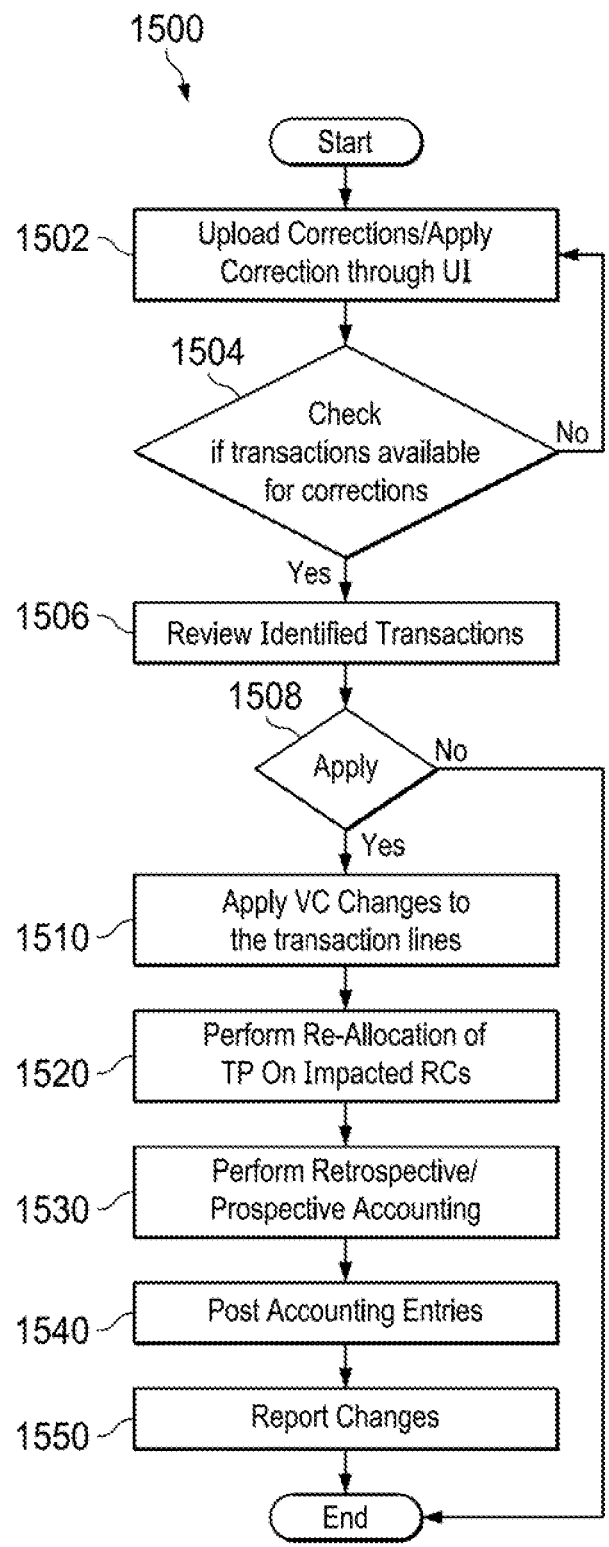
FIG. 15 illustrates a method of analyzing variable consideration in accordance with an embodiment of this disclosure.

FIG. 15 illustrates a method 1500 carried out by a VC analyzer module. The method 1500 begins at block 1502 in which corrections to VC transactions are uploaded and applied. Corrections can be automatically applied by the system or manually by a user via UI. The system then checks to see if transactions are available for corrections. If not, the method 1500 returns to block 1502. If transactions are available for corrections, the method proceeds to block 1506 in which identified transactions are reviewed. The determination is then made as to whether VC changes should be applied to transactions lines. If VC changes are not to be applied, the method 1500 can end. Otherwise, the method proceeds to block 1510 in which VC changes are applied to transactions lines as appropriate. The method 1500 then proceeds to block 1520 in which reallocation of TP on impacted retrospective considerations (RCs) is performed. The method 1500 then proceeds to block 1530 in which retrospective accounting or prospective accounting, or both, are performed. Accounting entries can then be posted 1540 and thereafter changes made earlier during the method are reported 1550. The method 1500 can then end.

In an embodiment within this disclosure, the system can be configured to receive transactions from a source system in a transaction currency and calculate transactional amounts in a base currency (or operating currency) and reporting currency. When the amount of revenue recognized for a revenue contract is greater than the billed or invoiced amount, the exchange rate for that day or for that period will be used to convert from transactional currency to the reporting currency. When a contract liability is created for a revenue contract, a netting process can be executed to offset a contract asset. In this process, the contract asset will be reversed using the exchange rate used to book the contract asset originally and the offset account (contract liability) will be booked using the exchange rate it was created as part of billing/invoicing. Since both side entries may use different exchange rate, the difference in conversion will be booked to a financial exchange (FX) Gain/Loss account. Alternately, when a transaction consumes the contract liability of another transaction, the exchange rate for the day of the transaction or for that period can be used to convert the revenue on the target transaction. The contract liability on the source transaction can thereafter be released using its historical exchange rate. In at least one embodiment, a target line will consume its self-referencing liability, before the target line will consume liability from other lines.

Figure 17:
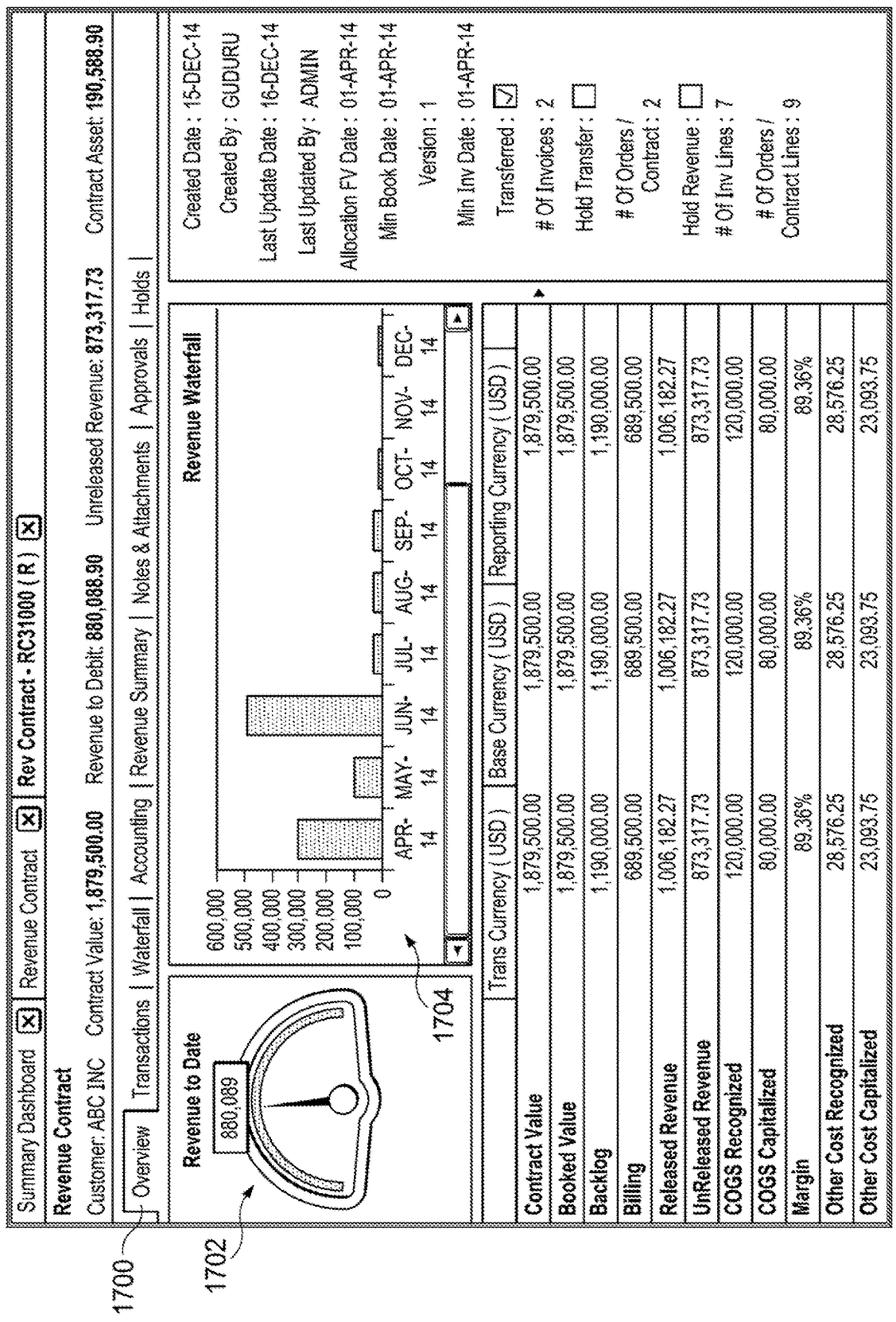
FIG. 17 illustrates information displayed under an overview tab of the workbench user interface.

A system of this disclosure can provide a 'workbench' UI 1600. A purpose of the workbench UI 1600 is to provide a complete and detailed view of a revenue contract. FIG. 16 illustrates an example of a workbench UI 1600. As can be seen in FIG. 16, revenue contracts and revenue progress for such contracts can be sorted and searched by customer 1602. The progress column 1604 shows the revenue released as of current date. FIG. 17 illustrates information displayed under an overview tab 1700 of the workbench UI 1600. As shown, overview tab 1700 provides a holistic view of various data elements pertaining to a specific revenue contract in a single screen. For example, the total amount of revenue accrued to certain date can be displayed in a revenue gauge 1702. Revenue corresponding to specified periods can be provided in a waterfall format 1704.

FIGS. 10A-J illustrate various UIs available through a workbench module/UI 1600.

Figure 18C:
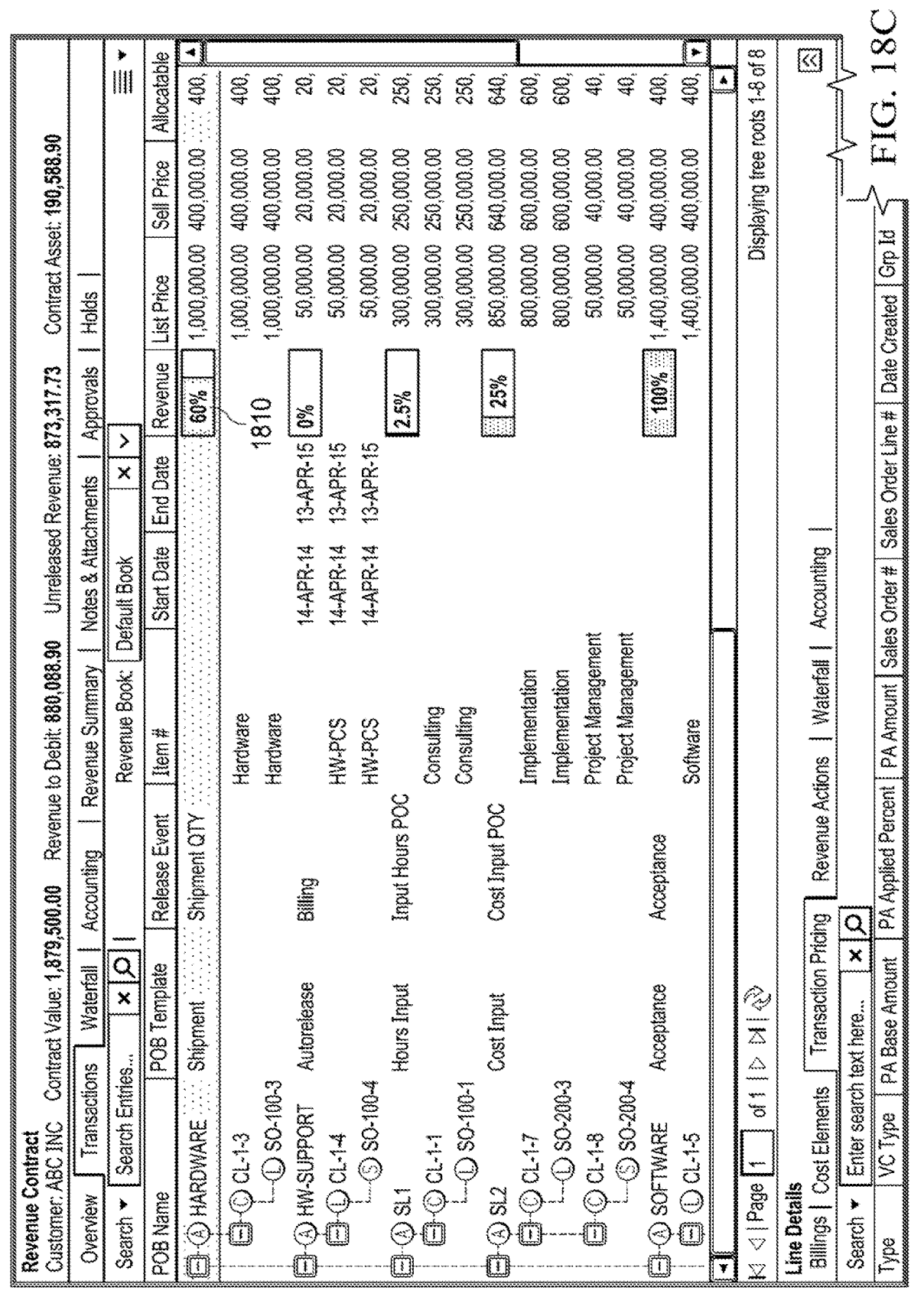

FIG. 18A and FIG. 18B illustrate information and functionality provided under a transactions tab 1800 of the workbench UT 1600. The transactions tab 1800, for example, displays information about a given revenue contract. Information or data displayed under the transaction tab 1800 can include, but is not limited to: a rollup of all transaction lines mapped to POBs; a rollup of all sales order transaction lines which linked to a particular contract line; delivery of goods and services; and association information of SO/Contract Lines with POB. The transactions tab 1800 can include various subtabs. Every line in the transactions tab 1800 can identified by an indicator, such as an icon. For example, under the POB name subtab 1802 an 'A' icon 1804 can indicate an item was generated by the system (automatically). An 'M' icon (not shown) can indicate an item was created manually (by a system user; for example). An 'S' icon 1808 denotes a sales order line, a 'C' icon 1810 denotes a contract line, and an 'L' icon 1811 denotes a leading indicator line. As intimated above, the leading indicator line is the line which drives revenue recognition. FIG. 18C displays variable consideration (VC) data which has been processing based on a particular VC configuration. As illustrated, VC data can include percentages 1810 of revenue realized for a given line.

Figure 18F:
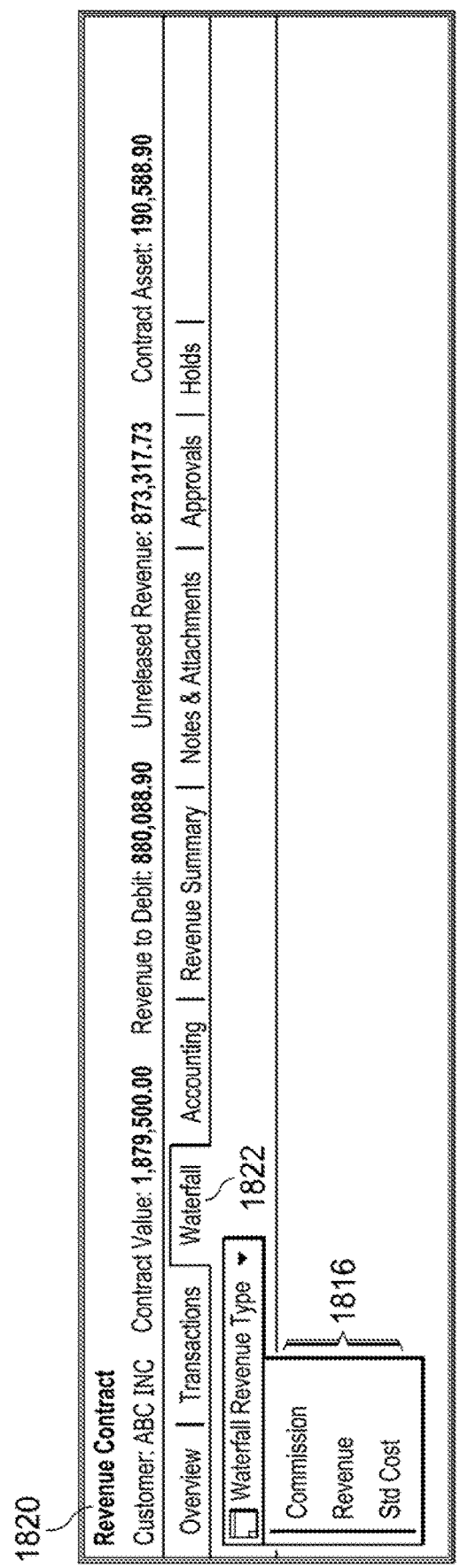

FIG. 18D illustrates waterfall information 1812 being displayed at line level. A waterfall can be generated to correspond to various cost types and revenue types, for example. FIG. 18E illustrates an example of accounting information 1814 generated based on revenue released 1815. In the example of FIG. 18E, accounting information 1814 is displayed below at line level. Such accounting information 1814 can also be displayed at a POB level. As illustrated in FIGS. 18E-G, the workbench UI 1600 can also enable display of various waterfall types 1816 (commission, revenue, standard cost, for example) at a revenue contract 1820 level, under the waterfall tab 1822. FIG. 18H shows accounting information 1824 for a revenue contract 1826 displayed by the workbench UI 1600 in a summarized format. As shown in FIG. 18H, the workbench UI 1600 can display a user-selectable icon 1828, which upon selection, can cause the accounting information 1824 to be displayed in a detailed format. FIG. 18I illustrates the accounting information 1824 displayed in a detailed format 1826. FIG. 18J illustrates information displayed under a revenue summary tab 1826 by the workbench UI 1600.

Figure 19:
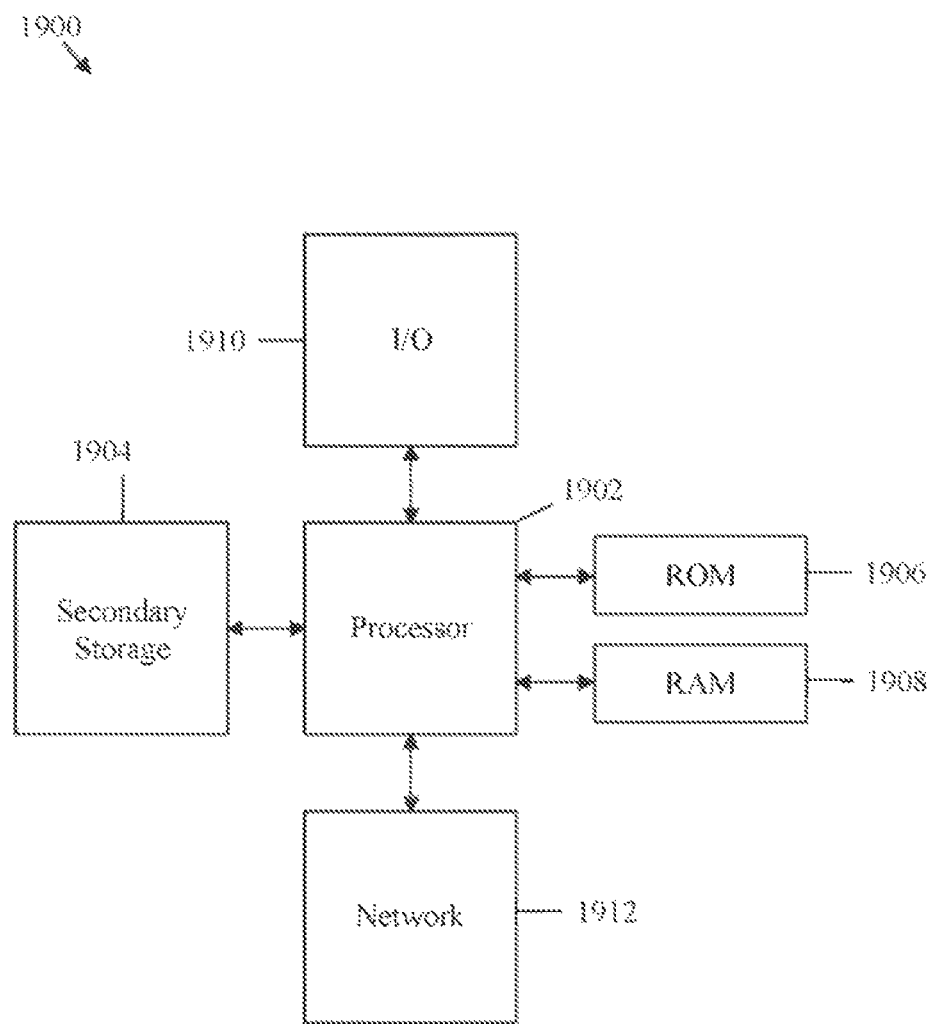
FIG. 19 illustrates a system configured to perform one or methods of this disclosure, and to provide one or more functionalities set forth in this disclosure.

FIG. 19 illustrates a system 1900 that may correspond to or may be part of a network component, such as a server, a switch, a router, or any other network nodes, and which can be used to execute one or more methods or run one or more modules set forth in this disclosure. The system 1900 includes a processor 1902 (which may be referred to as a central processor unit or CPU) that is in communication with memory devices including secondary storage 1904, read only memory (ROM) 1906, random access memory (RAM) 1908, input/output (I/O) devices 1910, and network connectivity devices 1912. The general-purpose network component 1900 may also comprise, at the processor 1902 and or any of the other components of the general-purpose network component 1900.

The processor 1902 may be implemented as one or more CPU chips, or may be part of one or more application specific integrated circuits (ASICs) and/or digital signal processors (DSPs). The processor 1902 may comprise a central processor unit or CPU. The processor may be implemented as one or more CPU chips. The secondary storage 1904 is typically comprised of one or more disk drives or tape drives and is used for non-volatile storage of data and as an over-flow data storage device if RAM 1908 is not large enough to hold all working data. Secondary storage 1904 may be used to store programs that are loaded into RAM 1908 when such programs are selected for execution. The ROM 1906 is used to store instructions and perhaps data that are read during program execution. ROM 1906 is a non-volatile memory device that typically has a small memory capacity relative to the larger memory capacity of secondary storage 1904. The RAM 1908 is used to store volatile data and perhaps to store instructions. Access to both ROM 1906 and RAM 1908 is typically faster than to secondary storage 1904.

In the preceding specification, various preferred implementations have been described with reference to the accompanying drawings. It will, however, be evident that various modifications and changes can be made thereto, and additional implementations can be implemented, without departing from the broader scope of the disclosure as set forth in the claims that follow. The specification and drawings are accordingly to be regarded in an illustrative rather than restrictive sense.

The invention claimed is:

1. A computer-implemented method of projecting revenue for a performance contract that includes variable consideration, the method comprising:

providing, by a server system to one or more client devices over a communication network, one or more interfaces for configuring based on corresponding business operations a set of one or more performance obligation rules for evaluating a performance contract that includes variable consideration;

receiving, by the server system from the one or more interfaces, first input data specifying the set of one or more performance obligation rules, each performance obligation rule of the set of one or more performance obligation rules including one or more conditions;

obtaining, by the server system, information associated with the performance contract, the performance contract including transaction lines associated with one or more transactions;

applying, by the server system, the set of one or more performance obligation rules to the performance contract to associate the transaction lines with a performance obligation template of one or more performance obligation templates to associate one or more performance obligations with one or more revenue recognition events;

receiving, by the server system, second input specifying one or more variable-consideration types associated with the variable consideration;

receiving, by the server system from a database over the communication network, historical transaction data associated with the one or more variable-consideration types;

using, by the server system, the one or more revenue recognition events and the historical transaction data associated with the one or more variable-consideration types to project revenue for the performance contract; and generating, by the server system, a report based on the projected revenue for the one or more performance obligations that correspond to the one or more revenue recognition events.

2. The computer-implemented method of claim 1, further comprising:

identifying an adjustment type for one of the one or more variable-consideration type;

using the one or more revenue recognition events and the historical transaction data associated with the one of the one or more variable-consideration types to generate a variable-consideration modifier for the one of the one or more variable-consideration types based on the adjustment type;

applying the variable-consideration modifier to the projected revenue.

3. The computer-implemented method of claim 2, wherein the variable-consideration modifier is based on a percentage.

4. The computer-implemented method of claim 2, wherein the variable-consideration modifier is based on an amount.

5. The computer-implemented method of claim 1, further comprising:

determining actual revenue from the one or more revenue recognition events;

determining one or more corrections to the projected revenue based on the actual revenue; and applying the one or more corrections.

6. The computer-implemented method of claim 5, further comprising:

reallocating the transaction lines by reallocating a transaction price in the performance contract in response to the one or more corrections applied to the one or more transactions.

7. The computer-implemented method of claim 5, further comprising:

applying the one or more corrections to individual transaction lines.

8. The computer-implemented method of claim 1, further comprising:

assigning a fair value to each transaction of the one or more transactions; and recognizing transactional revenue associated with the each transaction of the one or more transactions.

9. A server system for projecting revenue for a performance contract that includes variable consideration, the server system comprising:

at least one processor;

memory in communication with the at least one processor, the memory storing computer-executable instructions, which, upon execution by the at least one processor, cause the at least one processor to perform:

providing, by the server system to one or more client devices over a communication network, one or more interfaces for configuring based on corresponding business operations a set of one or more performance obligation rules for evaluating a performance contract that includes variable consideration;

receiving, by the server system from the one or more interfaces, first input data specifying the set of one or more performance obligation rules, each performance obligation rule of the set of one or more performance obligation rules including one or more conditions;

obtaining, by the server system, information associated with the performance contract, the performance contract including transaction lines associated with one or more transactions;

applying, by the server system, the set of one or more performance obligation rules to the performance contract to associate the transaction lines with a performance obligation template of one or more performance obligation templates to associate one or more performance obligations with one or more revenue recognition events;

receiving, by the server system, second input specifying one or more variable-consideration types associated with the variable consideration;

receiving, by the server system from a database over the communication network, historical transaction data associated with the one or more variable-consideration types;

using, by the server system, the one or more revenue recognition events and the historical transaction data associated with the one or more variable-consideration types to project revenue for the performance contract; and generating, by the server system, a report based on the projected revenue for the one or more performance obligations that correspond to the one or more revenue recognition events.

10. The server system of claim 9, wherein the computer-executable instructions further cause the at least one processor to perform:

identifying an adjustment type for one of the one or more variable-consideration types;

using the one or more revenue recognition events and the historical transaction data associated with the one of the one or more variable-consideration types to generate a variable-consideration modifier for the one of the one or more variable-consideration types based on the adjustment type;

applying the variable-consideration modifier to the projected revenue.

11. The server system of claim 10, wherein the variable-consideration modifier is based on a percentage.

12. The server system of claim 10, wherein the variable-consideration modifier is based on an amount.

13. The server system of claim 9, wherein the computer-executable instructions further cause the at least one processor to perform:
   determining actual revenue from the one or more revenue recognition events;
   determining one or more corrections to the projected revenue based on the actual revenue; and
   applying the one or more corrections.

14. The server system of claim 13, wherein the computer-executable instructions further cause the at least one processor to perform:
   reallocating the transaction lines by reallocating a transaction price in the performance contract in response to the one or more corrections applied to the one or more transactions.

15. The server system of claim 9, wherein the computer-executable instructions further cause the at least one processor to perform:
   applying the one or more corrections to individual transaction lines.

16. The server system of claim 9, wherein the computer-executable instructions further cause the at least one processor to perform:
   assigning a fair value to each transaction of the one or more transactions; and
   recognizing transactional revenue associated with the each transaction of the one or more transactions.

* * * * *